United States Patent
Baran et al.

(10) Patent No.: US 9,864,731 B2
(45) Date of Patent: Jan. 9, 2018

(54) SYSTEMS AND METHODS FOR DISTRIBUTED SOLUTION OF OPTIMIZATION PROBLEMS

(71) Applicant: Massachusetts Institute of Technology, Cambridge, MA (US)

(72) Inventors: Thomas A. Baran, Somerville, MA (US); Tarek A. Lahlou, Centreville, VA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/740,796

(22) Filed: Jun. 16, 2015

(65) Prior Publication Data

US 2016/0034820 A1 Feb. 4, 2016

Related U.S. Application Data

(60) Provisional application No. 62/012,571, filed on Jun. 16, 2014.

(51) Int. Cl.
*G06F 17/00* (2006.01)
*G06F 17/11* (2006.01)

(52) U.S. Cl.
CPC .................................. *G06F 17/11* (2013.01)

(58) Field of Classification Search
None
See application file for complete search history.

(56) References Cited

U.S. PATENT DOCUMENTS

2014/0188974 A1* 7/2014 Ioannidis ............ H04L 67/2842
709/202

OTHER PUBLICATIONS

"Duality in Linear Programming", Chapter 4, 2011, (in Applied Mathematical Programming, by Bradley, Hax and Magnanti) hereinafter AMP4, pp. 45 https://web.archive.org/web/20111225050111/http://web.mit.edu/15.053/www/AMP-Chapter-04.pdf.*
Baran "Conservation in Signal Processing Systems", Thesis, 2012, pp. 4 (4/214).*
Baran, "Conservation in Signal Processing Systems", 2012 (214 pages).

(Continued)

*Primary Examiner* — Li-Wu Chang
(74) *Attorney, Agent, or Firm* — Goodwin Procter LLP

(57) ABSTRACT

A framework is presented for designing a class of distributed, asynchronous optimization algorithms realized as signal processing architectures utilizing various conservation principles. The architectures are specifically based on stationary conditions pertaining to primal and dual variables in a class of generally nonconvex optimization problems. The stationary conditions, which are closely related to the principles of stationary content and co-content that naturally arise from Tellegen's theorem in electrical networks, are transformed via a linear change of coordinates to obtain a set of linear and nonlinear maps that form the basis for implementation. The resulting algorithms can operate by processing a linear superposition of primal and dual decision variables using the associated maps, coupled using synchronous or asynchronous delay elements to form a distributed system. Tables are provided containing example elements that can be assembled to form various optimization algorithms directly from the associated problem statements.

21 Claims, 29 Drawing Sheets

(56) References Cited

OTHER PUBLICATIONS

Baran et al., "A Robust Signal-Flow Architecture for Cooperative Vehicle Density Control", 2013 (5 pages).
Baran et al., "Linear Programming Algorithms for Sparse Filter Design", IEEE Transactions on Signal Processing, 2010, vol. 58, No. 3 (13 pages).
Boyd et al., "Distributed Optimization and Statistical Learning via the Alternating Direction Method of Multipliers", Foundations and Trends in Machine Learning, 2010, vol. 3, No. 1 (125 pages).
Chua et al., "Nonlinear Programming without Computation", IEEE Transactions on Circuits and Systems, 1984, vol. CAS-31, No. 2 (7 pages).
Dennis, "Mathematical Programming and Electrical Networks", 1958 (240).
Deprettre et al., "Orthogonal Cascade Realization of Real Multiport Digital Filters", Circuit Theory and Application, 1980, vol. 8 (28 pages).
Fettweis, "Wave Digital Filters: Theory and Practice", 198 (60 pages).
Forero et al., "Consensus-Based Distributed Support Vector Machines", Journal of Machine Learning Research, vol. 11, 2010 (45 pages).
Kennedy et al., "Neural Networks for Nonlinear Programming", IEEE Transactions on Circuits and Systems, vol. 35, No. 5, 1988 (9 pages).
Millar, "Some General Theorems for Non-Linear Systems Possessing Resistance", 1951 (12 pages).
Parikh et al., "Block Splitting for Distributed Optimization", Math. Prog. Comp., 2013 (26 pages).
Penfield et al., "Tellegen's Theorem and Electrical Networks", 1970 (157 pages).
Rao et al., "Orthogonal Digital Filters for VLSI Implementation", IEEE Transactions on Circuits and Systems, vol. CAS-31, No. 11, 1984 (13 pages).
Tellegen, "A General Network Theorem, with Applications", Philips Res. Rep. 7, 1952 (11 pages).
Wei et al., "Distributed Alternating Direction Method of Multipliers", 51st IEEE Conference on Decision and Control, 2012 (6 pages).
Willems, Dissipative Dynamical Systems Part I: General Theory, 1972 (31 pages).
Willems, "The Behavioral Approach to Open and Interconnected Systems", 2007 (54 pages).
Wyatt, "Little-Known Properties of Resistive Grids that are Useful in Analog Vision Chip Designs", 1995 (34 pages).

* cited by examiner

FIG. 2A

| Behavior (unnormalized coordinates) | Transformation matrices | Realization as a map | System properties |
|---|---|---|---|
| $\begin{bmatrix} a_p^{(e)} \\ a_\ell^{(e)} \end{bmatrix} \in \text{range}\left\{ \begin{bmatrix} I_{N_p^{(e)}} \\ A_\ell \end{bmatrix} \right\}$ $\begin{bmatrix} b_p^{(e)} \\ b_\ell^{(e)} \end{bmatrix} \in \text{range}\left\{ \begin{bmatrix} -A_\ell^T \\ I_{N_\ell^{(e)}} \end{bmatrix} \right\}$ | $M_k = \left( \begin{bmatrix} 1 & -1 \\ 1 & 1 \end{bmatrix}, \begin{bmatrix} -1 & 1 \\ 1 & 1 \end{bmatrix} \right),$ $\begin{array}{l} j \le k \le j + N_p^{(e)} \\ j + N_p^{(e)} + 1 \le k \le N_\ell + j \end{array}$ | $G_\ell = \left( I_{N_\ell^{(e)}} + \begin{bmatrix} 0 & -A_\ell^T \\ A_\ell & 0 \end{bmatrix} \right)\left( I_{N_\ell^{(e)}} - \begin{bmatrix} 0 & -A_\ell^T \\ A_\ell & 0 \end{bmatrix} \right)^{-1}$ $G_\ell c_\ell^{(j,l)} = d_\ell^{(j,l)}$ | neutral |

FIG. 2B

| Symbol | Reduced-form primal components | Reduced-form dual components |
|---|---|---|
| $\hat{Q}_k, \rho, a$ ... or $\hat{Q}_k, a, \hat{R}_k, \rho, b$ | $\hat{Q}_k(a) = 0$<br>$a = \rho$ | $\hat{R}_k(b) = \rho b$<br>$b \in \mathbb{R}$ |
| $\hat{Q}_k, a$ ... or $\hat{Q}_k, a, \hat{R}_k, \rho, b$ | $\hat{Q}_k(a) = \rho a$<br>$a \in \mathbb{R}$ | $\hat{R}_k(b) = 0$<br>$b = \rho$ |
| $\hat{Q}_k, a$ ... or $\hat{Q}_k, a, \hat{R}_k, b$ | $\hat{Q}_k(a) = |a|$<br>$a \in \mathbb{R}$ | $\hat{R}_k(b) = 0$<br>$-1 \le b \le 1$ |
| $\hat{Q}_k, a$ ... or $\hat{Q}_k, a, \hat{R}_k, \rho, b$ | $\hat{Q}_k(a) = \begin{cases} |a| & |a| \ge \frac{1}{\rho} \\ \frac{1}{2}\rho a^2 + \frac{1}{2\rho} & |a| < \frac{1}{\rho} \end{cases}$<br>$a \in \mathbb{R}$ | $\hat{R}_k(b) = \frac{1}{2\rho}b^2 - \frac{1}{2\rho}$<br>$-1 \le b \le 1$ |

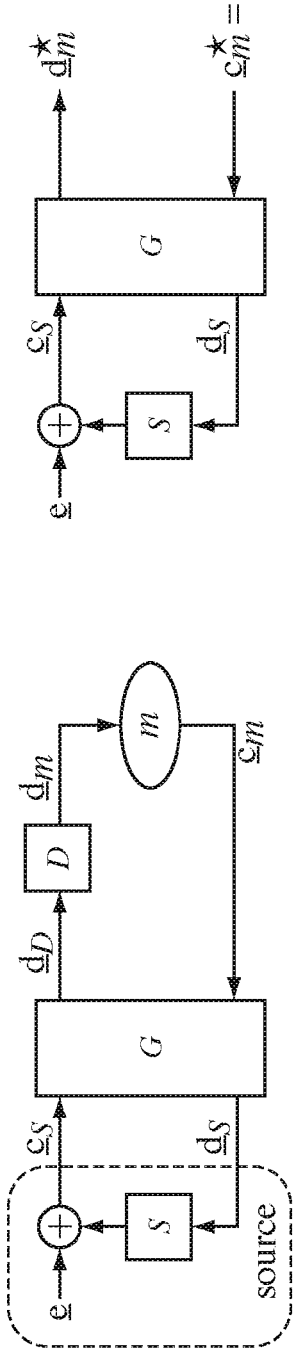
FIG. 4A
FIG. 4B
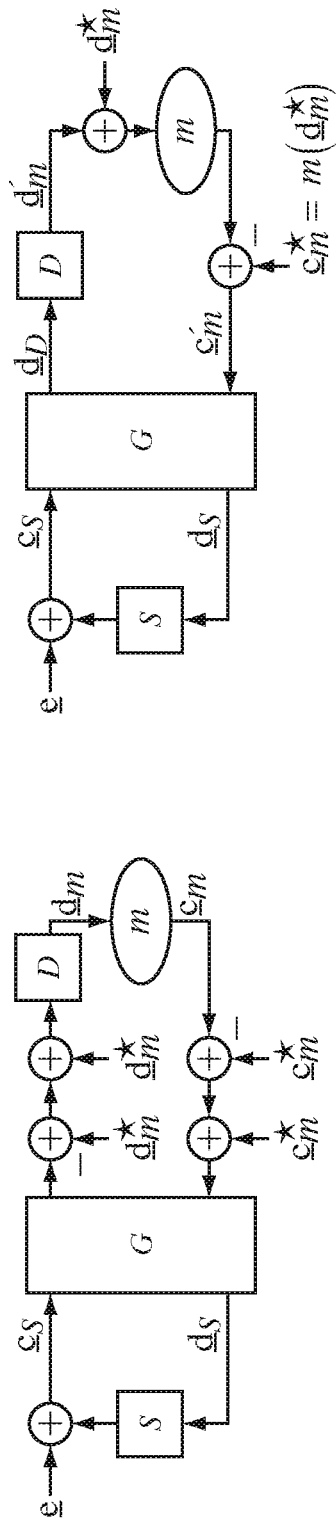
FIG. 4C
FIG. 4D

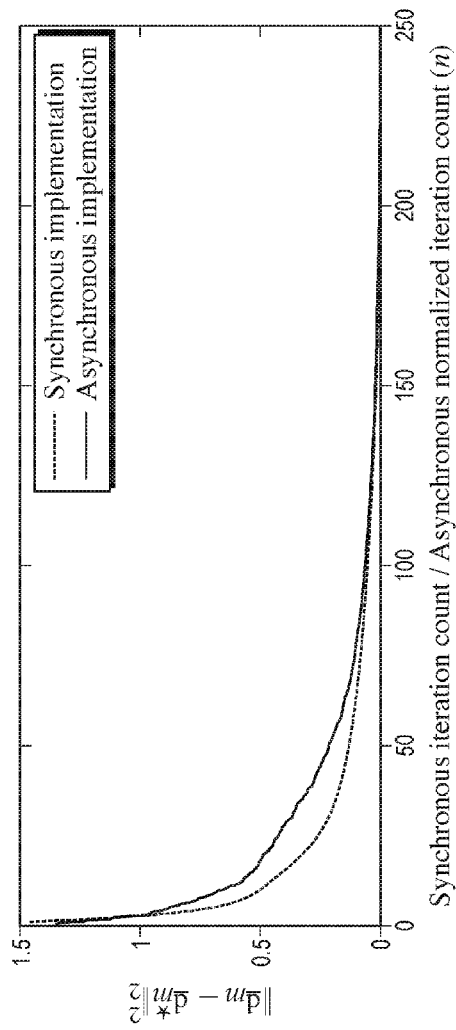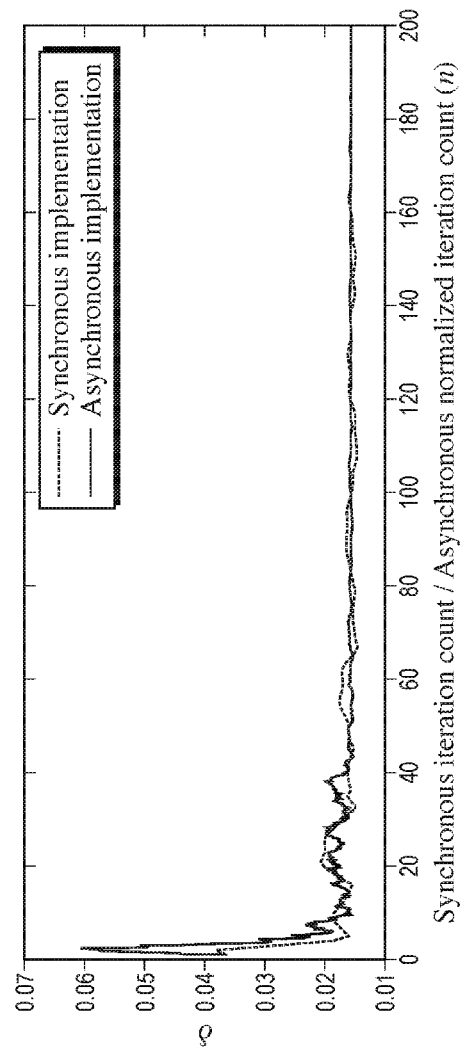
FIG. 7B
FIG. 7C

US 9,864,731 B2

SYSTEMS AND METHODS FOR DISTRIBUTED SOLUTION OF OPTIMIZATION PROBLEMS

CROSS REFERENCE TO RELATED APPLICATION

This application claims priority to and the benefit of, and incorporates herein by reference in its entirety, U.S. Provisional Patent Application No. 62/012,571, entitled "Conservative Signal Processing Architectures for Asynchronous, Distributed Optimization," which was filed on Jun. 16, 2014.

FIELD OF THE INVENTION

This disclosure generally relates to distributed processing systems and, in particular to distributed processing systems for solving optimization problems.

BACKGROUND

The solutions to many real-world problems such as allocating and scheduling resources (e.g., processors, robots, airplanes), digital filter design, planning urban development, configuring a supply chain, designing a manufacturing process, etc., are often obtained by casting the problem to be solved as an optimization problem and then by solving that optimization problem. Typically, a cost/benefit is associated with the optimization problem and solving the optimization problem generally entails minimizing the cost and/or maximizing the benefit. Often, though not always, the cost minimization and/or benefit maximization is performed under one or more constraints. Such optimization problems can be complex and a single processor may take up to several hours or days to solve a particular problem. Therefore, at least partially dividing the optimization problem into parts and distributing the task of solving two or more parts to different processors can result in performance improvement.

In designing distributed, asynchronous algorithms/systems for solving an optimization problem, a common approach is to begin with a non-distributed, single iteration of the optimization problem or with a distributed, synchronous implementation thereof, and to attempt to organize variables so that the optimization algorithm can be distributed across several unsynchronized processing nodes. An important limitation of this strategy is that it does not take into account, a priori, what algorithms might be amenable to a distributed, asynchronous implementation, potentially resulting in architectures of an overly-specific class.

SUMMARY

In various embodiments, a framework described herein facilitates construction of distributed, asynchronous systems for solving optimization problems by analyzing the problem itself and without relying on any non-distributed and/or synchronous implementations. Therefore, using this framework, system architectures that may not be readily derived according to conventional techniques (e.g., starting from a non-distributed and/or synchronous implementation) can be generated. Various embodiments enable directly designing from different kinds of optimization problems a wide variety of algorithm architectures for convex and nonconvex optimization that can be distributed across several processing elements utilizing synchronous or asynchronous updates. This is achieved, at least in part, by selecting for each term of a specified optimization problem either a constitutive relation element or a linear interconnection element. The selected constitutive relation elements can perform particular computations required in solving the optimization problem and each one of the selected linear interconnection elements can transform one generally vector-valued variable associated with the optimization problem into another generally vector-valued variable required in solving the problem. The linear interconnection elements may also perform certain computations. A system built by interconnecting the selected constitutive relation elements and linear interconnection elements can solve the specified optimization problem in a distributed, asynchronous manner.

Accordingly, in one aspect a method is provided for configuring a processing system to solve an optimization problem. The method includes, for each term of an optimization problem, selecting using a selector either (i) a constitutive relation element representing a computation corresponding to the term, or (ii) a linear interconnection element representing a computation transforming a first vector variable associated with the term into a second vector variable associated with the term. The method also includes interconnecting each selected constitutive relation element and each selected linear interconnection element. In addition, the method includes configuring a first processing module of a processing system to implement a computation represented by a first constitutive relation element, a first linear interconnection element, or both.

In various embodiments, the optimization problem includes an overall cost function. Each constitutive relation element is associated with a respective individual cost function, and a sum of the respective individual cost functions equals the overall cost function. The optimization problem may include one or more constraints.

In some embodiments, the first processing module is configured to implement the computation represented by the first constitutive relation element, and the method additionally includes: (i) further configuring the first processing module to implement a computation represented by a second constitutive relation element, and/or (ii) further configuring the first processing module to implement a computation represented by at least one linear interconnection element. The method may also include inserting a first delay element between the first constitutive relation element and the first linear interconnection element. In some embodiments, the delay element is inserted only if a type of the first constitutive relation element is other than source element. A delay time associated with the first delay element may be randomly selected.

In some embodiments, the first processing module is configured to implement the computation represented by the first constitutive relation element and the method further includes configuring a second, different processing module of the processing system to implement the computation represented by the first linear interconnection element. The method may further include inserting a first delay module in a data path between the first and second processing modules. The first delay module may have a delay at least equal to a delay of the first delay element. A computation time of the first processing module in implementing the computation represented by the first constitutive relation element may be at most equal to a delay of the first delay element. Alternatively, or in addition, a computation time of the second processing module in implementing the computation represented by the first linear interconnection element may be at most equal to the delay of the first delay element.

In some embodiments, the method includes inserting a second delay element between a second constitutive relation element and the first linear interconnection element. In addition, the method may include configuring a third processing module of the processing system to implement a computation represented by the second constitutive relation element. In some embodiments, the method further includes inserting a second delay element between the first constitutive relation element and a second linear interconnection element, and configuring a third processing module of the processing system to implement a computation represented by the second linear interconnection element. The method may include further configuring the second processing module to implement a computation represented by a second constitutive relation element.

In some embodiments, the first delay element includes a vector delay element and the first constitutive relation element includes a vector constitutive relation element. The first processing module may include a number of processing elements (e.g., processors, cores, threads of a single processor, etc.), and each processing element may be configured to implement a computation represented by a respective element of the vector constitutive relation element.

In some embodiments, the method further includes solving the optimization problem by iteratively running the first and second processing modules until convergence. In each iteration, the first processing module may perform the computation represented by the first constitutive relation element, and the second processing module may perform the computation represented by the first linear interconnection element. Data communication between the first and second processing modules may include (i) passing at least one value of the first vector variable, and/or (ii) passing at least one update to the first vector variable. The first and/or second processing modules may be further configured to generate in one or more iterations a linear combination of a current value of the first vector variable and one or more of the previous values of the first vector variable.

In another aspect, a synthesis system for configuring a processing system to solve an optimization problem includes a first processor and a first memory in electrical communication with the first processor. The first memory includes instructions which, when executed by a processing unit that may include the first processor and/or a second processor and that is coupled to a memory module including either the first memory or a second memory, or both, program the processing unit, to select, for each term of an optimization problem, either (i) a constitutive relation element representing a computation corresponding to the term, or (ii) a linear interconnection element representing a computation transforming a first vector variable associated with the term into a second vector variable associated with the term. The instructions also program the processing unit to interconnect each selected constitutive relation element and each selected linear interconnection element. In addition, the instructions program the processing unit to configure a first processing module of a processing system to implement a computation represented by a first constitutive relation element, a first linear interconnection element, or both. In various embodiments, the instructions can program the processing unit to perform one or more of the method steps described above. The system may include several solvers, where each solver is separate from the controller.

In another aspect, an article of manufacture that includes a non-transitory storage medium has stored therein instructions which, when executed by a processing unit program the processing unit, which is in electronic communication with a memory module, to solve an optimization problem. In particular, the instructions program the processing unit to select, for each term of an optimization problem, either (i) a constitutive relation element representing a computation corresponding to the term, or (ii) a linear interconnection element representing a computation transforming a first vector variable associated with the term into a second vector variable associated with the term. The instructions also program the processing unit to interconnect each selected constitutive relation element and each selected linear interconnection element. In addition, the instructions program the processing unit to configure a first processing module of a processing system to implement a computation represented by a first constitutive relation element, a first linear interconnection element, or both. In various embodiments, the instructions can program the processing unit to perform one or more of the method steps described above.

In another aspect, a method is provided for facilitating synthesis of a customized processing system to solve optimization problems. The method includes selecting a transformation matrix and transforming a pair of input and output variables, by applying the selected transformation matrix thereto, into a pair of primal and dual decision variables. The method also includes applying one or more stationarity conditions to the pair of the primal and dual decision variables to obtain a canonical representation of an optimization component that includes a functional constraint. In addition, the method includes modifying the canonical representation into a reduced-form representation of the optimization component by modifying the functional constraint into a set-based constraint.

The method finally includes configuring a processor to implement a computation corresponding to the reduced-form representation of the optimization component. The processor thus configured can be used in the customized processing system to solve various optimization problems. The optimization component can be either a constitutive relation element or a linear interconnection element. As such, the processor may configured to implement either a computation corresponding to the constitutive relation element, or a computation corresponding to the linear interconnection element.

In another aspect, a synthesis system for facilitating synthesis of a customized processing system to solve optimization problems includes a first processor and a first memory in electrical communication with the first processor. The first memory includes instructions which, when executed by a processing unit that may include the first processor and/or a second processor and that is coupled to a memory module including either the first memory or a second memory, or both, program the processing unit, to select a transformation matrix and transform a pair of input and output variables, by applying the selected transformation matrix thereto, into a pair of primal and dual decision variables. The instructions also program the processing unit to apply one or more stationarity conditions to the pair of the primal and dual decision variables to obtain a canonical representation of an optimization component that includes a functional constraint. In addition, the instructions program the processing unit to modify the canonical representation into a reduced-form representation of the optimization component by modifying the functional constraint into a set-based constraint.

Moreover, the instructions program the processing unit to configure a processing module to implement a computation corresponding to the reduced-form representation of the optimization component. The processing module thus configured can be used in the customized processing system to solve various optimization problems. The optimization component can be either a constitutive relation element or a linear interconnection element. As such, the processing module may configured to implement either a computation corresponding to the constitutive relation element, or a computation corresponding to the linear interconnection element.

In another aspect, an article of manufacture that includes a non-transitory storage medium has stored therein instructions which, when executed by a processing unit program the processing unit, which is in electronic communication with a memory module, to select a transformation matrix and transform a pair of input and output variables, by applying the selected transformation matrix thereto, into a pair of primal and dual decision variables. The instructions also program the processing unit to apply one or more stationarity conditions to the pair of the primal and dual decision variables to obtain a canonical representation of an optimization component that includes a functional constraint. In addition, the instructions program the processing unit to modify the canonical representation into a reduced-form representation of the optimization component by modifying the functional constraint into a set-based constraint.

Moreover, the instructions program the processing unit to configure a processing module to implement a computation corresponding to the reduced-form representation of the optimization component. The processing module thus configured can be used in the customized processing system to solve various optimization problems. The optimization component can be either a constitutive relation element or a linear interconnection element. As such, the processing module may configured to implement either a computation corresponding to the constitutive relation element, or a computation corresponding to the linear interconnection element.

In another aspect, a method is provided for facilitating synthesis of a customized processing system to solve optimization problems. The method includes modifying a reduced-form representation of an optimization component into a canonical representation having a cost function corresponding to a pair of primal and dual decision variables. The method also includes transforming a corresponding set-based constraint on the pair of the primal and dual decision variables into a transformed constraint. The set-based constraint satisfies a stationarity condition and the transformed constraint satisfies a transformed stationarity condition. In addition, the method includes deriving a functional relationship between input and output variables, where the functional relationship satisfies the transformed constraint.

The method further includes configuring a processor to implement the functional relationship. The processor thus configured can be used in the customized processing system to solve various optimization problems. The functional relationship may correspond to either a constitutive relation element and a linear interconnection element. As such, the processor may be configured to implement either a computation corresponding to the constitutive relation element or a computation corresponding to the linear interconnection element.

In another aspect, a synthesis system for facilitating synthesis of a customized processing system to solve optimization problems includes a first processor and a first memory in electrical communication with the first processor. The first memory includes instructions which, when executed by a processing unit that may include the first processor and/or a second processor and that is coupled to a memory module including either the first memory or a second memory, or both, program the processing unit, to modify a reduced-form representation of an optimization component into a canonical representation having a cost function corresponding to a pair of primal and dual decision variables. The instruction also program the processing unit to transform a corresponding set-based constraint on the pair of the primal and dual decision variables into a transformed constraint, where the set-based constraint satisfies a stationarity condition and the transformed constraint satisfies a transformed stationarity condition. In addition, the instructions program the processing unit to derive a functional relationship between input and output variables, where the functional relationship satisfies the transformed constraint.

Finally, the instructions program the processing unit to configure a processing module to implement the functional relationship. The processing module thus configured can be used in the customized processing system to solve various optimization problems. The functional relationship may correspond to either a constitutive relation element and a linear interconnection element. As such, the processing module may be configured to implement either a computation corresponding to the constitutive relation element or a computation corresponding to the linear interconnection element.

In another aspect, an article of manufacture that includes a non-transitory storage medium has stored therein instructions which, when executed by a processing unit program the processing unit, which is in electronic communication with a memory module, to modify a reduced-form representation of an optimization component into a canonical representation having a cost function corresponding to a pair of primal and dual decision variables. The instruction also program the processing unit to transform a corresponding set-based constraint on the pair of the primal and dual decision variables into a transformed constraint, where the set-based constraint satisfies a stationarity condition and the transformed constraint satisfies a transformed stationarity condition. In addition, the instructions program the processing unit to derive a functional relationship between input and output variables, where the functional relationship satisfies the transformed constraint.

Finally, the instructions program the processing unit to configure a processing module to implement the functional relationship. The processing module thus configured can be used in the customized processing system to solve various optimization problems. The functional relationship may correspond to either a constitutive relation element and a linear interconnection element. As such, the processing module may be configured to implement either a computation corresponding to the constitutive relation element or a computation corresponding to the linear interconnection element.

In another aspect, a method is provided for synthesizing an optimization problem for implementation by a processing system. The method includes receiving a selection of: (a) one or more constitutive relation elements, each representing a computation, and (b) one or more linear interconnection elements, each representing a computation transforming a first vector variable into a second vector variable. The method also includes receiving a network configuration interconnecting each selected constitutive relation element and each selected linear interconnection element. The method also includes synthesizing an optimization problem having a number of terms. Each term may correspond to one of: (A) a computation represented by a constitutive relation element, and (B) a computation represented by a linear interconnection element. The synthesized optimization problem is capable of implementation by a processing system that corresponds to the received network configuration.

In another aspect, a synthesis system for synthesizing an optimization problem for implementation by a processing system includes a first processor and a first memory in electrical communication with the first processor. The first memory includes instructions which, when executed by a processing unit that may include the first processor and/or a second processor and that is coupled to a memory module including either the first memory or a second memory, or both, program the processing unit, to receive a selection of: (a) one or more constitutive relation elements, each representing a computation, and (b) one or more linear interconnection elements, each representing a computation transforming a first vector variable into a second vector variable. The instructions also program the processing unit to receive a network configuration interconnecting each selected constitutive relation element and each selected linear interconnection element. The instructions further program the processing unit to synthesize an optimization problem having a number of terms. Each term may correspond to one of: (A) a computation represented by a constitutive relation element, and (B) a computation represented by a linear interconnection element. The synthesized optimization problem is capable of implementation by a processing system that corresponds to the received network configuration.

In another aspect, an article of manufacture that includes a non-transitory storage medium has stored therein instructions which, when executed by a processing unit program the processing unit, which is in electronic communication with a memory module, to receive a selection of: (a) one or more constitutive relation elements, each representing a computation, and (b) one or more linear interconnection elements, each representing a computation transforming a first vector variable into a second vector variable. The instructions also program the processing unit to receive a network configuration interconnecting each selected constitutive relation element and each selected linear interconnection element. The instructions further program the processing unit to synthesize an optimization problem having a number of terms. Each term may correspond to one of: (A) a computation represented by a constitutive relation element, and (B) a computation represented by a linear interconnection element. The synthesized optimization problem is capable of implementation by a processing system that corresponds to the received network configuration.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 2A and 2B depict a table including a linear interconnection element that can be used in configuring processing systems to solve optimization problems according to various embodiments.

Figure 3C:
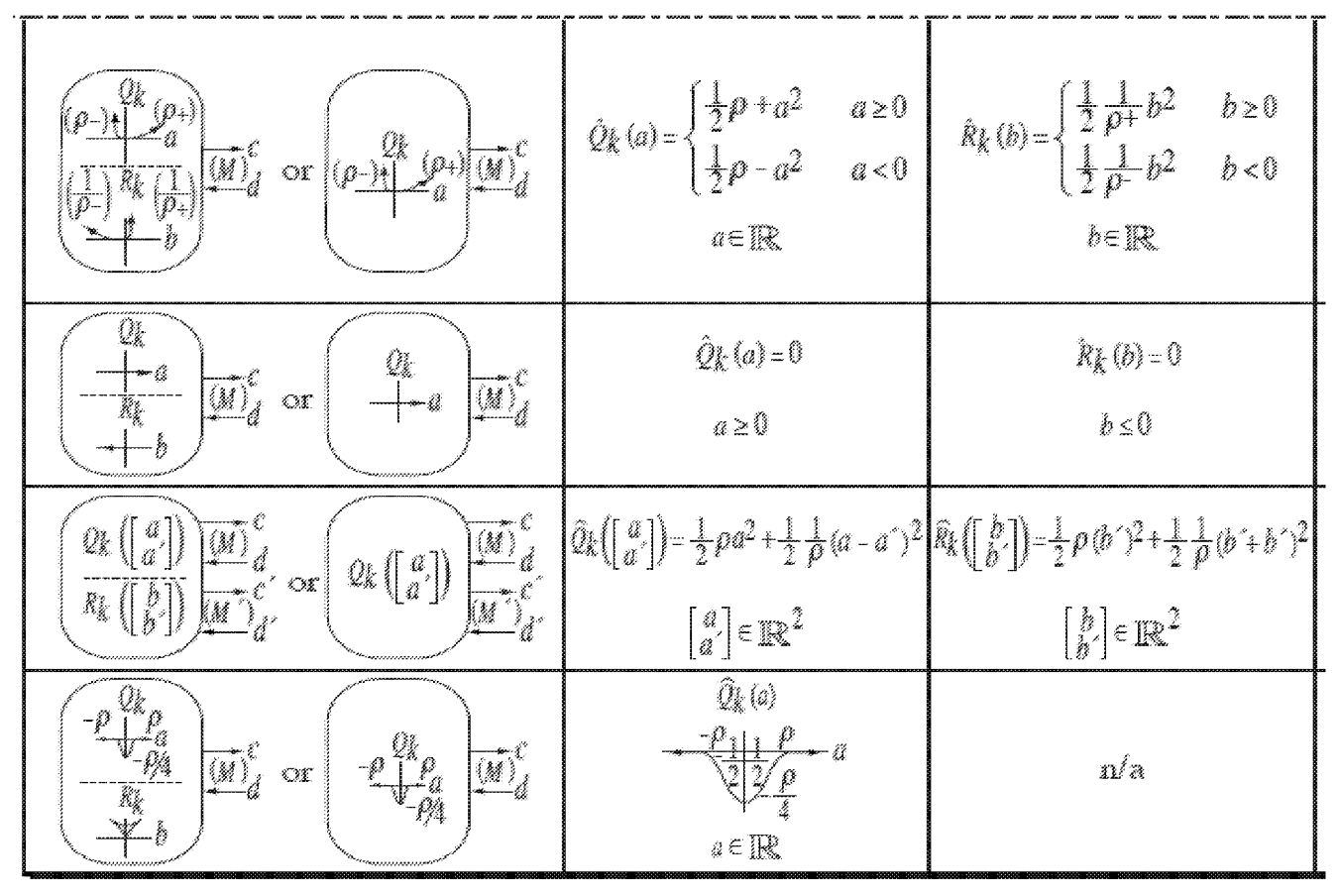

FIGS. 3A through 3D depict a table including various constitutive relation elements that can be used in configuring processing systems to solve optimization problems according to various embodiments;

FIG. 4A schematically depicts a generalized architecture of systems synthesized according to various embodiments to solve optimization problems;

FIGS. 4B-4D schematically depict a framework for analyzing convergence of the generalized architecture depicted in FIG. 4A;

FIGS. 7B-7E illustrate results of executing the system depicted in FIG. 7A;

DETAILED DESCRIPTION

Classes of Maps

Figure 1:
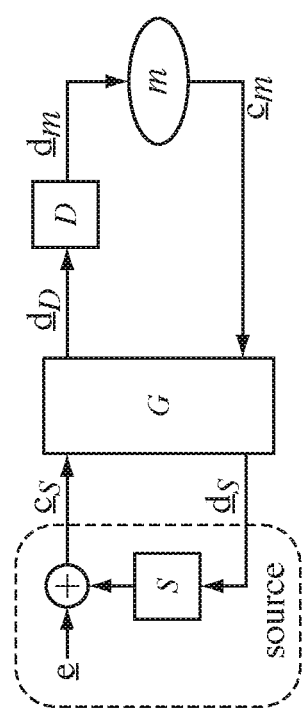
FIG. 1 schematically depicts a general interconnection of elements in various presented architectures.

We make use of several specific terms in describing linear and nonlinear maps. The term "neutral" generally refers to any map m(•) for which:

$$\|m(x)\| = \|x\|, \forall x, \quad (1)$$

with |•| being used to denote the 2-norm. The expression "∀ x" in Eq. 1 is generally used to indicate all vectors x in the domain over which m(•) is defined.

We denote as "passive about $\underline{x}'$" any map m(•) for which $$\sup_{x \neq 0} \frac{\|m(x+x') - m(x')\|}{\|x\|} \leq 1. \quad (2)$$

As a subset of passive maps, we denote as "dissipative about $\underline{x}'$" any map m(•) for which $$\sup_{x \neq 0} \frac{\|m(x+x') - m(x')\|}{\|x\|} \leq 1. \quad (3)$$

A map that is "passive everywhere" or "dissipative everywhere" is a map that is passive, or respectively dissipative, about all points $\underline{x}'$.

The term "source" may be used to refer to a map that is written as $$m_k(\underline{d}_k^{(CR)}) = S\underline{d}_k^{(CR)} + \underline{e}_k \quad (4)$$

where $\underline{e}$ is a constant vector and where the map that is associated with the matrix S is passive.

Notation for Partitioning Vectors

We commonly refer to various partitionings of column vectors, each containing a total of N real scalars, in the development and analysis of a presented class of architectures. To facilitate the indexing associated with various vectors, we establish an associated notational convention. Specifically we refer to two key partitionings of a length-N column vector z: one where the elements are partitioned into a total of K column vectors denoted $\underline{z}_k^{(CR)}$, and another where the elements are partitioned into a total of L column vectors denoted $\underline{z}_l^{(LI)}$. Each vector $\underline{z}_l^{(LI)}$ may be partitioned into subvectors that we may write as $\vec{z}_l^{(i)T}$ and $\vec{z}_l^{(o)T}$. Thus, we can formally write a vector as:

$$[z_1, \ldots, z_N]^T = \left[\underline{z}_1^{(CR)T}, \ldots, \underline{z}_K^{(CR)T}\right]^T \quad (5)$$

$$= \left[\underline{z}_1^{(LI)T}, \ldots, \underline{z}_L^{(LI)T}\right]^T \quad (6)$$

$$= z \in \mathbb{R}^N. \quad (7)$$

$$\underline{z}_l^{(LI)} = \left[\underline{z}_l^{(i)T}, \underline{z}_l^{(o)T}\right]^T, \quad l = 1, \ldots L. \quad (8)$$

The length of a particular subvector $\underline{z}_k^{(CR)}$, $\underline{z}_l^{(LI)}$, $\underline{z}_l^{(i)T}$, or $\vec{z}_l^{(o)T}$ may respectively be denoted $N_k^{(CR)}$, $N_l^{(LI)}$, $N_l^{(i)}$, $N_l^{(o)}$, with $$N = N_1^{(CR)} + \ldots + N_K^{(CR)} \quad (9)$$

$$= N_1^{(LI)} + \ldots + N_L^{(LI)} \quad (10)$$

$$N_l^{(LI)} = N_l^{(i)} + N_l^{(o)}, \quad l = 1, \ldots L. \quad (11)$$

Class of Optimization Problems

The class of optimization problems addressed within the presented framework is similar in form to those problems described by the well-known principles of stationary content and co-content in electrical networks, which have been used in constructing circuits for performing convex and nonconvex optimization. These principles and implementations implicitly or explicitly utilize a non-convex duality theory where physical conjugate variables, e.g., voltage and current, are identified as primal and dual decision variables within the associated network. In various embodiments, we utilize the multidimensional, parametric generalization of the principles of stationary content and co-content.

We define a dual pair of problems within the presented class first in a form that can be used for analysis from a variational perspective, which we refer to as "canonical form". We also utilize an alternative form obtained by performing algebraic manipulations on problems in canonical form, referred to as "reduced form". Optimization problems may typically be written in reduced form for the purpose of relating their formulations to those of generally well-known classes of convex and nonconvex problems.

Canonical-Form Representation

Making use of the partitioning convention established in Eqns. 5-11, we write a specific primal problem in canonical form as $$\min_{\substack{\{y_1, \ldots, y_N\} \\ \{a_1, \ldots, a_N\}}} \sum_{k=1}^{K} Q_k(\underline{y}_k^{(CR)}) \quad (12)$$

$$\text{s.t.} \quad \underline{a}_k^{(CR)} = f_k(\underline{y}_k^{(CR)}), \quad k = 1, \ldots, K \quad (13)$$

$$A_l a_l^{(i)} = a_l^{(o)}, \quad l = 1, \ldots, L. \quad (14)$$

The functionals $$Q_k(\cdot): \mathbb{R}^{N_k^{(CR)}} \to \mathbb{R}$$

included in the summation in (12) are in particular related to the functions $$f_k(\cdot): \mathbb{R}^{N_k^{(CR)}} \to \mathbb{R}^{N_k^{(CR)}}$$

in (13) according to the following:

$$\nabla Q_k(\underline{y}_k^{(CR)}) = J_{f_k}^T(\underline{y}_k^{(CR)}) g_k(\underline{y}_k^{(CR)}), \quad (15)$$

where $f_k(\bullet)$ and $$g_k(\cdot): \mathbb{R}^{N_k^{(CR)}} \to \mathbb{R}^{N_k^{(CR)}}$$

are generally nonlinear maps whose respective Jacobian matrices $J_{f_k}^T(\underline{y}_k^{(CR)})$ and $J_{g_k}(\underline{y}_k^{(CR)})$ are assumed to exist. We use the convention that the entry in row i and column j of $J_{f_k}(\underline{y}_k^{(CR)})$ is the partial derivative of output element i of $f_k(\underline{y}_k^{(CR)})$, with respect to element j of the input vector $\underline{y}_k^{(CR)}$, evaluated at $\underline{y}_k^{(CR)}$. Each of $$A_l: \mathbb{R}^{N_l^{(i)}} \to \mathbb{R}^{N_l^{(o)}} A_l: \mathbb{R}^{N_l^{(i)}} \to \mathbb{R}^{N_l^{(o)}},$$

l=1, . . . , L is a linear map.

Given a primal problem written in canonical form as (12)-(14), we write the associated dual problem in canonical form as $$\max_{\substack{\{y_1, \ldots, y_N\} \\ \{b_1, \ldots, b_N\}}} -\sum_{k=1}^{K} R_k(\underline{y}_k^{(CR)}) \quad (16)$$

$$\text{s.t.} \quad \underline{b}_k = g_k(\underline{y}_k^{(CR)}), k = 1, \ldots, K \quad (17)$$

$$\underline{b}_\ell^{(i)} = -A_\ell^T \underline{b}_\ell^{(o)}, \ell = 1, \ldots, L \quad (18)$$

where $$R_k(\underline{y}_k^{(CR)}) = \langle f_k(\underline{y}_k^{(CR)}), g_k(\underline{y}_k^{(CR)}) \rangle - Q_k(\underline{y}_k^{(CR)}), k = 1, \ldots, K \quad (19)$$

As is suggested by the notation established earlier, the primal and dual costs and constraints in (12), (13), (16), and (17) may be specified using a total of K constitutive relations within the presented class of architectures. Likewise the primal and dual linear constraints in (14) and (18) may be specified in the presented class of architectures using a total of L linear interconnection elements.

Reduced-Form Representation

For various choices of $Q_k(\cdot)$ and $f_k(\cdot)$, it is generally possible that the set of points traced out in $\underline{a}_k^{(CR)}$–$Q_k$, generated by sweeping $\underline{y}_k^{(CR)}$, is one that could equivalently have been generated using a functional relationship mapping from $$\underline{a}_k^{(CR)} \in R^{N_k^{(CR)}} \text{ to } Q_k \in \mathbb{R},$$

possibly with $a_k^{(CR)}$ being restricted to an interval or set. In cases where this is possible for all $f_k$–$Q_k$ pairs forming (12)-(14), we can formulate the problems in terms of functionals $$\hat{Q}_k(\cdot):\mathbb{R}^{N_k^{(CR)}} \to \mathbb{R}$$

and sets $$A_k \subseteq \mathbb{R}^{N_k^{(CR)}}$$

in what we refer to as "reduced form":

$$\min_{\{a_1,\ldots,a_N\}} \sum_{k=1}^{K} \hat{Q}_k(\underline{a}_k^{(CR)}) \quad (20)$$

$$\text{s.t. } \underline{a}_k^{(CR)} \in A_k, k = 1, \ldots, K \quad (21)$$

$$A_\ell \underline{a}_\ell^{(i)} = \underline{a}_\ell^{(o)}, \ell = 1, \ldots, L. \quad (22)$$

A reduced-form representation may specifically be used when $Q_k(\cdot)$, $f_k(\cdot)$, $\hat{Q}_k(\cdot)$ and $A_k$ satisfy the following relationship:

$$\left\{ \begin{bmatrix} f_k(\underline{y}_k^{(CR)}) \\ Q_k(\underline{y}_k^{(CR)}) \end{bmatrix} : \underline{y}_k^{(CR)} \in \mathbb{R}^{N_k^{(CR)}} \right\} = \left\{ \begin{bmatrix} \underline{a}_k^{(CR)} \\ \hat{Q}_k(\underline{a}_k^{(CR)}) \end{bmatrix} : \underline{a}_k^{(CR)} \in A_k \right\} \quad (23)$$

One key idea in expressing a problem in reduced form, i.e. (20)-(22), is to provide a formulation that allows for set-based constraints on decision variables, in addition to allowing for cost functions that need not be differentiable everywhere. It is, for example, generally possible to define functions $\hat{f}_k(\cdot)$ and $g_k(\cdot)$ that are differentiable everywhere, resulting in a canonical-form cost term $Q_k(\cdot)$ that is differentiable everywhere, and for an associated reduced-form cost term $\hat{Q}_k(\cdot)$ satisfying Eq. 23 to have knee points where its derivative is not well-defined.

A dual canonical-form representation (16)-(18) may similarly be written in reduced form:

$$\max_{\{b_1,\ldots,b_N\}} -\sum_{k=1}^{K} \hat{R}_k(\underline{b}_k) \quad (24)$$

s.t. $\underline{b}_k \in \mathcal{B}_k, k = 1, \ldots, K$ (25)

$\underline{b}_\ell^{(i)} = -A_\ell^T \underline{b}_\ell^{(o)}, \ell = 1, \ldots, L.$ (26)

where $\hat{R}_k(\cdot):\mathbb{R}^{N_k^{(CR)}} \to \mathbb{R}$ and $\mathcal{B}_k \subseteq \mathbb{R}^{N_k^{(CR)}}$ for which $$\left\{ \begin{bmatrix} g_k(\underline{y}_k^{(CR)}) \\ R_k(\underline{y}_k^{(CR)}) \end{bmatrix} : \underline{y}_k^{(CR)} \in \mathbb{R}_k^{(CR)} \right\} = \left\{ \begin{bmatrix} \underline{b}_k \\ \hat{R}_k(\underline{a}_k^{(CR)}) \end{bmatrix} : \underline{b}_k \in \mathcal{B}_k \right\}. \quad (27)$$

We note that if a primal problem is representable in reduced form, the dual problem may or may not have an associated reduced-form representation, or vice-versa. The last row of the table in FIGS. 3A through 3D provides an example of this.

Stationary Conditions

As a consequence of the formulation of the primal and dual problems in canonical form, respectively (12)-(14) with (15), and (16)-(18) with (19), the dual pair of feasibility conditions serve as stationarity conditions for the dual pair of costs. Specifically, any point described by the set of vectors $\underline{y}_k^{*(CR)}$ that satisfies Eqns. 13-14 and 17-18, is a point about which both the primal cost (12) and dual cost (16) are constant to first order, given any small change in $\underline{y}_k^{*(CR)}$ for which the primal constraints (14) and dual constraints (18) remain satisfied.

Class of Architectures

The central idea behind the presented class of architectures is to determine a solution to the stationary conditions of Eqns. 13-14 and 17-18, in particular by interconnecting various signal-flow elements and running the interconnected system until it reaches a fixed point. The elements in the architecture are specifically memoryless, generally nonlinear maps that are coupled via synchronous or asynchronous delays, which in some embodiments we generally model as discrete-time, sample-and-hold elements triggered by independent discrete-time Bernoulli processes.

A general approach for interconnecting the various system elements is depicted in FIG. 1. Referring to this figure, systems in the presented class of architectures may include of a set of L memoryless, linear, orthonormal interconnections $G_l$ that are in the aggregate denoted G, coupled directly to a set of K maps $m_k(\cdot)$. In some embodiments, a subset of the maps $m_k(\cdot)$ that have the property of being source elements are specifically connected directly to G, and the remaining maps $m(\cdot)$, denoted on the whole as $m_k(\cdot)$, are coupled to the interconnection via delay elements. Algebraic loops may generally exist between the remaining source elements and the interconnection, and as these are linear these loops may be eliminated by performing appropriate algebraic reduction.

Given a particular system within the presented class, we have two key requirements of the system:

(R1) The system converges to a fixed point, and (R2) Any fixed point of the system corresponds to a solution of the stationarity conditions in Eqns. 13-14 and 17-18.

The issue of convergence in (R1) relates to the dynamics of the interconnected elements, and (R2) relates to the behavior of the interconnection of the various memoryless maps forming the system, with the delay elements being replaced by direct sharing of variables. We refer to the "behavior" of a system of maps as the set of all input and output signal values consistent with the constraints imposed by the system.

Coordinate Transformations

In satisfying (R1) and (R2), the general strategy is to perform a linear, invertible coordinate transformation of the primal and dual decision variables $\underline{a}$ and $\underline{b}$, and to use the transformed stationarity conditions, obtained by transforming Eqns. 13-14 and 17-18, to form the basis for the synchronous or asynchronous system summarized in FIG. 1. The linear stationarity conditions in Eqns. 14 and 18 may in particular be used in defining the linear interconnections $G_k$, and the generally nonlinear stationarity conditions in Eqns. 13 and 17 may be used in defining the constitutive relations $m_k(\bullet)$.

We specifically utilize coordinate transformations consisting of a pairwise superposition of the primal and dual decision variables $a_i$ and $b_i$, resulting in transformed variables denoted $c_i$ and $d_i$. The associated change of coordinates can be written formally in terms of a total of N, 2×2 matrices $M_i$ as $$\begin{bmatrix} c_i \\ d_i \end{bmatrix} = M_i \begin{bmatrix} a_i \\ b_i \end{bmatrix}, i = 1, \ldots, N. \quad (28)$$

Viewing the transformed variables $c_i$ and $d_i$ as entries of column vectors written $\underline{c}$ and $\underline{d}$, we may make use of the partitioning scheme described in Eqns. 5-11. Linear maps denoted $M_k^{(CR)}$ and $M_\ell^{(LI)}$ may likewise be used to represent the relationship described in Eq. 28 in a way that is consistent with the various associated partitionings:

$$\begin{bmatrix} \underline{c}_k^{(CR)} \\ \underline{d}_k^{(CR)} \end{bmatrix} = M_k^{(CR)} \begin{bmatrix} \underline{a}_k^{(CR)} \\ \underline{b}_k^{(CR)} \end{bmatrix}, k = 1, \ldots, K \quad (29)$$

$$\begin{bmatrix} \underline{c}_\ell^{(LI)} \\ \underline{d}_\ell^{(LI)} \end{bmatrix} = M_\ell^{(LI)} \begin{bmatrix} \underline{a}_\ell^{(LI)} \\ \underline{b}_\ell^{(LI)} \end{bmatrix}, \ell = 1, \ldots, L. \quad (30)$$

Referring again to FIG. 1, we use the variables $c_i$ and $d_i$ to respectively denote the associated linear interconnection inputs and outputs, and we denote the constitutive relation inputs using $c_i$ and the associated outputs using $d_i$. Related to this, we use $c_i^*$ and $d_i^*$ to denote a fixed point of a system within the presented framework, i.e. we use $c_i^*$ and $d_i^*$ to indicate a solution to the transformed stationarity conditions.

It is then verified that the transformation specified in Eq. 28, applied to the stationarity conditions in Eqns. 13-14 and 17-18, results in transformed stationarity conditions that can be written as $$G_l c_l^{*(LI)} = d_l^*(LI), l=1, \ldots, L \quad (31)$$

$$m_k(d_k^{*(CR)}) = c_k^{*(CR)}, k=1, \ldots, K, \quad (32)$$

where $G_l$ and $m_k$ satisfy the following relationships:

$$\left\{ M_\ell^{(LI)} \begin{bmatrix} \underline{a}_\ell^{(i)} \\ A_\ell \underline{a}_\ell^{(i)} \\ -A_\ell^T \underline{b}_\ell^{(o)} \\ \underline{b}_\ell^{(o)} \end{bmatrix} : \begin{bmatrix} \underline{a}_\ell^{(i)} \\ \underline{b}_\ell^{(o)} \end{bmatrix} \in \mathbb{R}^{N_\ell^{(LI)}} \right\} = \left\{ \begin{bmatrix} \underline{c}_\ell^{(LI)} \\ G_l \underline{c}_\ell^{(LI)} \end{bmatrix} : \underline{c}_\ell^{(LI)} \in \mathbb{R}^{N_\ell^{(LI)}} \right\}, \quad (33)$$

$$\ell = 1, \ldots, L$$

and $$\left\{ M_k^{(CR)} \begin{bmatrix} f_k(\underline{y}_k^{(CR)}) \\ Q_k(\underline{y}_k^{(CR)}) \end{bmatrix} : \underline{y}_k^{(CR)} \in \mathbb{R}^{N_k^{(CR)}} \right\} = \left\{ \begin{bmatrix} m_k(\underline{d}_k^{(CR)}) \\ \underline{d}_k^{(CR)} \end{bmatrix} : \underline{d}_k^{(CR)} \in \mathbb{R}^{N_k^{(CR)}} \right\}, k = 1, \ldots, K. \quad (34)$$

Figure 2A:
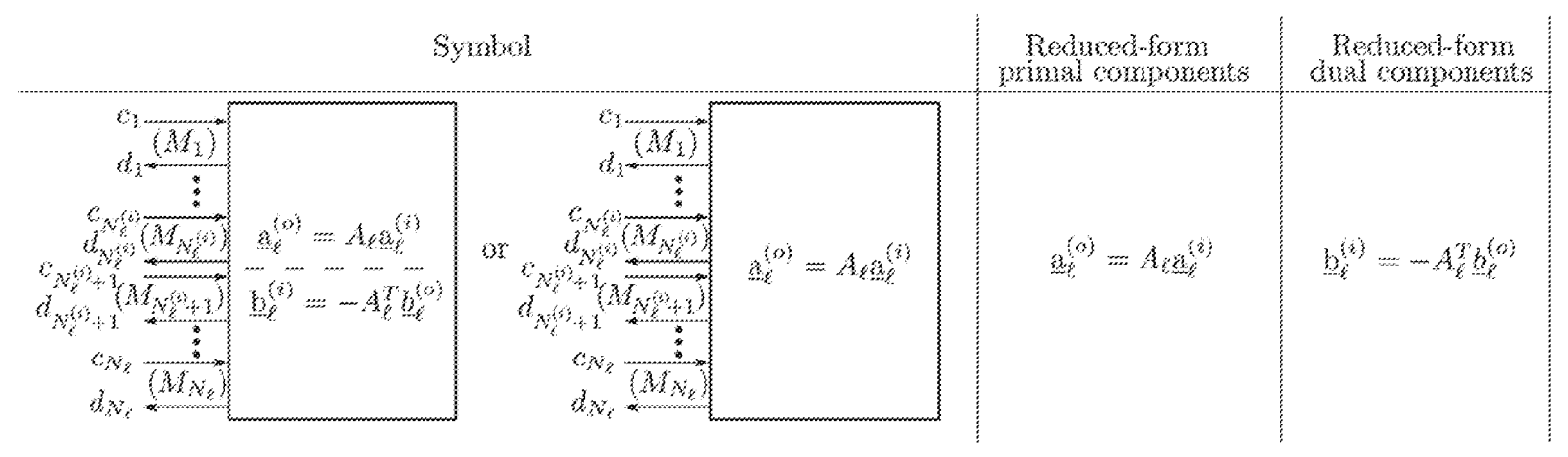

FIGS. 2A and 2B show an example of an interconnection elements satisfying Eq. 33. FIGS. 3A through 3D show various example constitutive relations satisfying Eq. 34. Given a solution $c_i^*$ and $d_i^*$ to Eqns. 31-32, the associated reduced-form primal and dual variables $a_i^*$ and $b_i^*$ can be obtained by inverting the relationship specified by the 2×2 matrices in Eq. 28. A significant potential obstacle in performing a change of coordinates is that for a pre-specified set of transformations $M_i$ and maps $f_k(\bullet)$, $g_k(\bullet)$ and $A_l$, there generally may not exist maps $m_k(\bullet)$ and $G_l$ that satisfy Eqns. 33-34. However the class of transformations $M_i$ of interest are shown below to always result in a valid maps $G_l$, and a broad and useful class of maps corresponding to various convex and nonconvex optimization problems are depicted in FIGS. 3A through 3D.

With reference to FIGS. 2A, 2B, and 3A through 3D, the second and third columns of the tables, labeled "Reduced-form primal components" and "Reduced-form dual components," represent terms in a specified optimization problem that, using the tables, correspond to components that can be used to implement the computation represented by each associated term in the problem. As such, a term in the specified optimization problem is analyzed to find a suitable match from the second and third columns of the tables shown in FIGS. 2A, 2B, and 3A through 3D. The matching can be performed via string comparison, pattern matching, machine learning, etc. The parameters of these components may be adjusted according to the specified optimization problem. The transformation matrix relating the input and output variables and the corresponding primal and dual variables is provided in the fifth column of the tables. The entries in the sixth column of the tables, labeled "Realization as a map" describe the computation performed by a processing module implementing a selected linear interconnection element corresponding to a row of the table in FIGS. 2A and 2B or a selected constitutive relation element corresponding to any row of the table in FIGS. 3A through 3D.

Conservation Principle

In designing physical systems for convex and nonconvex optimization and distributed control, the conservation principle resulting from Eqns. 14 and 18, specifically orthogonality between vectors of conjugate variables, is a key foundation on which the systems are developed. In electrical networks, this principle is specifically embodied by Tellegen's theorem. In particular, the conditions in Eqns. 14 and 18 imply $$\sum_{i=1}^{N} a_i b_i = \sum_{\ell=1}^{L} \langle \underline{a}_\ell^{(i)}, -A_\ell^T \underline{b}_\ell^{(o)} \rangle + \langle A_\ell \underline{a}_\ell^{(i)}, \underline{b}_\ell^{(o)} \rangle = 0, \quad (35)$$

which was obtained using Eqns. 14 and 18.

Viewing the left-hand side of Eq. 35 as a quadratic form, Eq. 35 can be shown to be isomorphic to the quadratic form including the left-hand side of the following conservation principle:

$$\sum_{i=1}^{N} c_i^2 - d_i^2 = 0. \quad (36)$$

Eq. 36 is similar to the statement of conservation of pseudopower in the wave-digital class of signal processing structures, and within that and other classes of systems is the foundation for analyzing stability and robustness in the presence of delay elements.

Motivated by this and (R1), we specifically require that the variables $c_i$ and $d_i$ in the framework satisfy Eq. 36, and in particular we require that the 2×2 matrices $M_i$ in Eq. 28 be chosen so that the resulting interconnection elements $G_l$ are orthonormal matrices, as a means of satisfying Eq. 36. The relevance of this requirement to convergence is discussed below. As the stationarity conditions in Eqns. 14 and 18 imply Eq. 35, which can be shown to be isomorphic to Eq. 36 via transformations of the form of Eq. 28, we can be ensured that such matrices $G_l$ satisfying Eq. 33 exist.

Example Architecture Elements

FIGS. 2A, 2B, and 3A through 3D depict interconnection elements and constitutive relations that respectively satisfy Eqns. 33 and 34. A distributed, asynchronous optimization algorithm may be realized, i.e., implemented by connecting the constitutive relations in FIGS. 3A through 3D to the interconnection elements in FIGS. 2A and 2B and eliminating algebraic loops as discussed previously using linear algebraic reduction and synchronous or asynchronous delays.

Figure 3B:
Figure 3D:
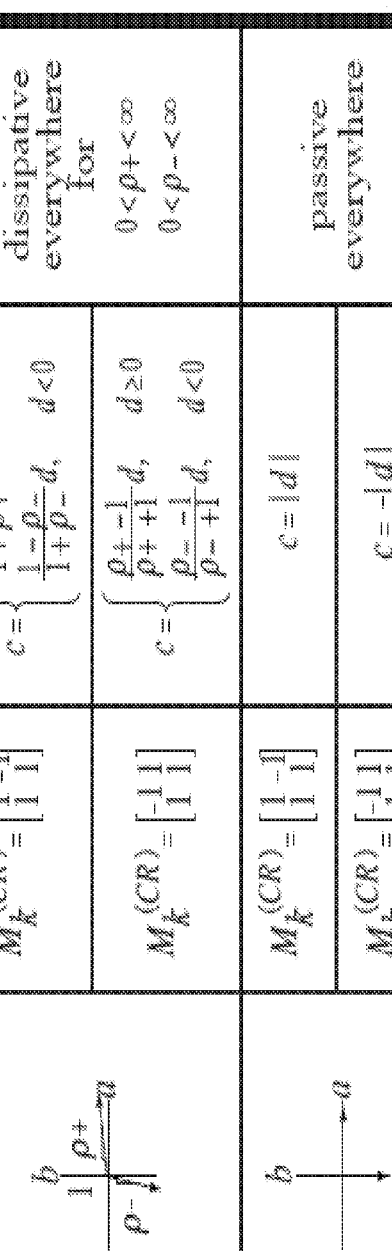

Various classes of asynchronous, distributed optimization systems, demonstrating the use of the framework discussed earlier are now presented. The design of each class of systems is based upon the use of the following strategy:

1) Write a reduced-form optimization problem.
2) Select the appropriate elements from FIGS. 2-3 that implement the associated transformed stationarity conditions, and connect the selected elements. Delay-free loops can result.
3) Break delay-free loops:
   a) For any constitutive relation that is a source element, perform algebraic simplification thereby incorporating the solution of the algebraic loop into the interconnection.
   b) Insert synchronous or asynchronous delays between the remaining constitutive relations and the interconnection.
4) Run the distributed system until it reaches a fixed point, i.e., point of convergence. The system properties in FIGS. 3A through 3D can indicate when convergence is guaranteed.

Read out the primal and dual decision variables $a_t$ and $h_t$ by multiplying the variables $c_t$ and $d_t$ by the inverses of the 2×2 matrices used in transforming the stationarity conditions.

Example Architectures

FIGS. 5A-10E depict various asynchronous, distributed optimization algorithms implemented using the presented framework, specifically making use of the elements in FIGS. 2-3. In some implementations of the systems shown in FIGS. 5-10, the asynchronous delay elements were numerically simulated using discrete-time sample-and-hold systems triggered by independent Bernoulli processes, with the probability of sampling being 0.1.

Analysis of Convergence: FIG. 4(a) summarizes the overall interconnection of elements composing the presented systems as discussed previously, and FIGS. 4(b)-(d) illustrate a general strategy for analyzing their convergence. FIG. 4(b) specifically depicts a solution to the transformed stationary conditions, with maps $m_k(\bullet)m_k(\bullet)$ corresponding to source relationships being expressed separately. The approach in analyzing the convergence is to begin with the system in FIG. 4(b), perform the additions and subtractions of the variables $c_i^* c_i^*$ and $d_i^* d_i^*$ indicated in FIG. 4(c), and obtain the system in FIG. 4(d) by subtracting FIG. 4(b) from FIG. 4(c).

FIG. 4. (a) General description of the interconnection of elements used in the presented systems. (b)-(d) Various manipulations performed in analyzing the convergence of the presented systems as discussed in the text.

There are various ways that the system in FIG. 4(d) can be used in determining sufficient conditions for convergence. Generally, arguments for convergence utilizing FIG. 4(d) involve identifying conditions for which $\|\underline{d}_D\|$ in this figure is strictly less than $\|d'_m\|$, except at 0. Using the definition of a source element presented earlier and the fact that G is orthonormal, we can conclude from FIG. 4(d) that $$\|\underline{d}_D\| \leq \|\underline{c}'_m\|. \quad (37)$$

If, for example, the solution to the transformed stationarity conditions $c_i^*$ and $d_i^*$ is known to be unique, and additionally if the ensemble of constitutive relations denoted m(-) m($\bullet$) is known to be dissipative about $\underline{d}_m^*$, then from FIG. 4(d) we conclude that $\|c'_m\| < \|d'_m\|$ except at 0, resulting in $$\|\underline{d}_D\| < \|\underline{d}'_m\| \quad (38)$$

except at 0. Eq. 38 implies, for example, that coupling the constitutive relations denoted m($\bullet$) m($\bullet$) to the linear interconnection elements via deterministic vector delays, the discrete-time signal denoted $\underline{d}'_m[n]$ can converge to 0 and so the signal $d_m[n]$ can converge to $\underline{d}^*_m$.

The uniqueness of the stationary conditions and the property of the constitutive relations being dissipative used in the preceding argument are not, however, strictly required. A more general line of reasoning involves justifying Eq. 38 in the vicinity of any such solution $c_i^*$ and $d_i^*$, for example by observing that even if specific constitutive relations m($\bullet$) are norm-increasing, the overall interconnected system results in a map from $\underline{d}'_m$ to $\underline{d}_D$ that is norm-reducing in the vicinity of that solution.

Arguments for convergence involving a justification of Eq. 38 can also be applied in a straightforward way to systems utilizing asynchronous delays, modeled as discrete-time sample-and-hold systems triggered by independent Bernoulli processes. In particular taking the expected value of $\|\underline{d}'_{(m)}[n]\|$, applying the law of total expectation, substituting in Eq. 38, and performing algebraic manipulations, it can be shown that $E[\|\underline{d}'_{(m)}[n]\|]$ converges to 0.

Figure 5A:
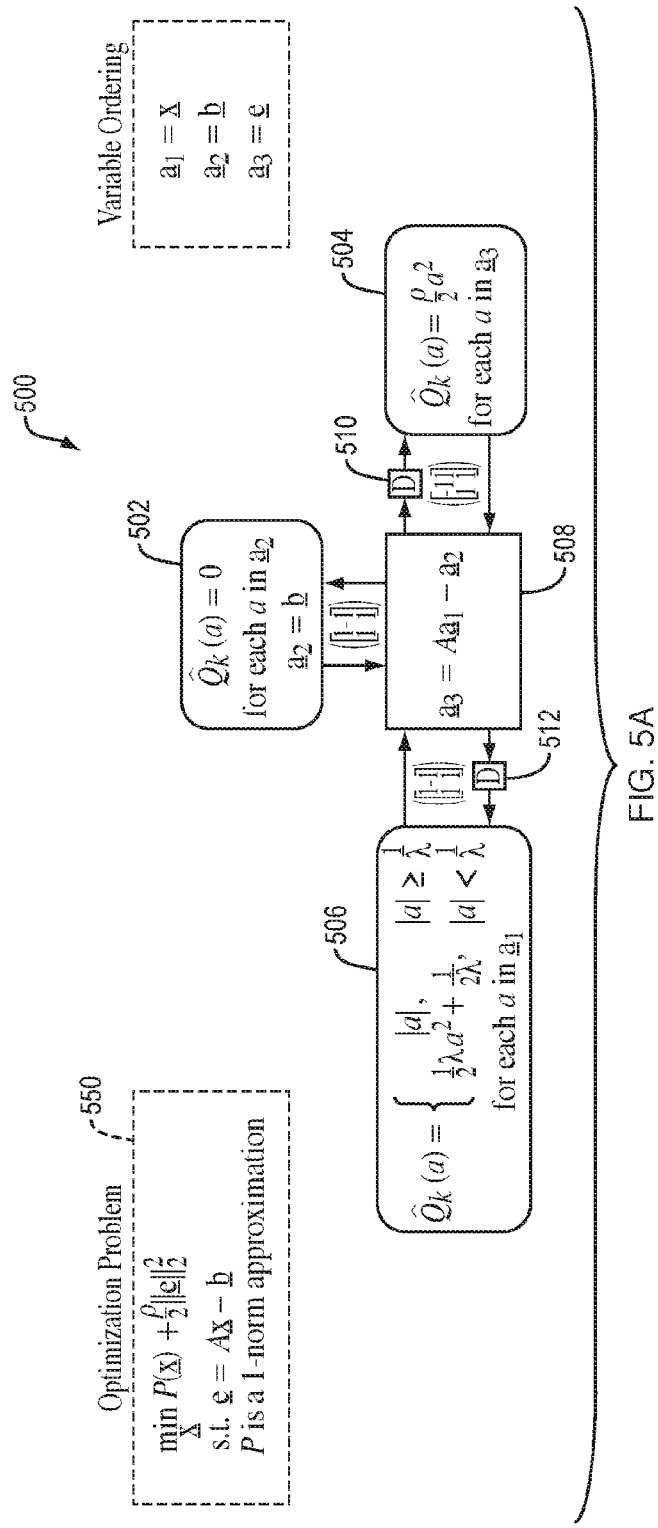
FIG. 5A schematically depicts an implementation of a system for solving the LASSO problem, according to one embodiment.

FIG. 5A depicts a signal processing system 500 for solving the LASSO problem identified as the optimization problem 550. The elements 502-506 are various constitutive relation elements corresponding different terms of the optimization problem 550, and the element 508 is a linear interconnection element. The parameters $\lambda$ and $\rho$ are selected to specify the interval outside of which the 1-norm approximation is exact and to tradeoff between the sparsity of the solution and the enforcement of the linear equality constraints, respectively. For the depicted solution $\lambda$ and $\rho$ are selected to be large, e.g., $\lambda = 10^5$ and $\rho = 2000$.

The system 500 also includes delay elements 510, 512 between the linear interconnection element 508 and the constitutive relation elements 504, 506, respectively. As such, in one embodiment, the elements 504, 506, and 508 are implemented by different processing modules. In some embodiments, the element 502 may be implemented by the same processing module that implements the element 508, and in other embodiments, the element 502 may also be implemented by a different processing module. In some embodiments, either or both of the elements 504, 506 can be implemented by the processing module implementing the linear interconnection element 508. In some embodiments, all of the elements 502-508 may be implemented by a single processing module.

In order to solve the optimization problem, one processing module generally communicates with another processing module. In general, a processing module sends or receives values of one or more variables in each iteration. The variables are typically vector variables but may also represent scalar quantities. In some embodiments, updates and/or incremental updates to values are exchanged. A processing module may generate in one or more iterations a linear combination of a current value of a vector variable and one or more of the previous values of the first vector variable. The weights or coefficients of the linear combination can be adjusted.

In one embodiment, either one or both delay elements 510, 512 can be an implicit delay element. Thus, the delay between a processing module implementing the linear interconnection element 508 and the processing module implementing the constitutive relation element 504 can be approximately (i.e., within 0.2%, 0.5%, 1%, 5%, 10%, etc.), of the delay of the processing module implementing the constitutive relation element 504. Alternatively or in addition, the delay between the processing module implementing the linear interconnection element 508 and the processing module implementing the constitutive relation element 504 can be approximately (i.e., within 0.2%, 0.5%, 1%, 5%, 10%, etc.), of the delay of the processing module implementing the linear interconnection element 508.

In general, the delay of the processing module is the time required by the processing module to perform the computation represented by the element implemented by the processing module. If the delay element between a constitutive relation element and a linear interconnection element is an implicit, logical entity, the processing modules implementing the two elements can be connected to each other without a hardware delay module therebetween. The processing module performing the computations of the constitutive relation element (or the linear interconnection element) may simply send the result of the computation to the other processing module, i.e., the processing module performing the computations of the linear interconnection element (or the constitutive relation element), when the former has performed the computations thereof. Such a configuration can facilitate asynchronous communication between a processing module implementing the linear interconnection element and a processing module implementing the constitutive relation element. Asynchronous communication can improve the performance of the overall processing system used to solve the optimization problem.

In some embodiments, either one or both delay elements 510, 512 can be an explicit delay element, implemented by a hardware delay module such as a buffer, latch, register, etc. Thus, the delay between a processing module implementing the linear interconnection element 508 and the processing module implementing the constitutive relation element 504 can be at least equal to the delay of the processing module implementing the constitutive relation element 504. Alternatively, or in addition, the delay between the processing module implementing the linear interconnection element 508 and the processing module implementing the constitutive relation element 504 can be at least equal to the delay of the processing module implementing the linear interconnection element 508. The delay introduced by the delay element can be a multiple of the corresponding processing module delay. Such a configuration can facilitate synchronous communication between a processing module implementing the linear interconnection element and a processing module implementing the constitutive relation element.

Figure 5B:
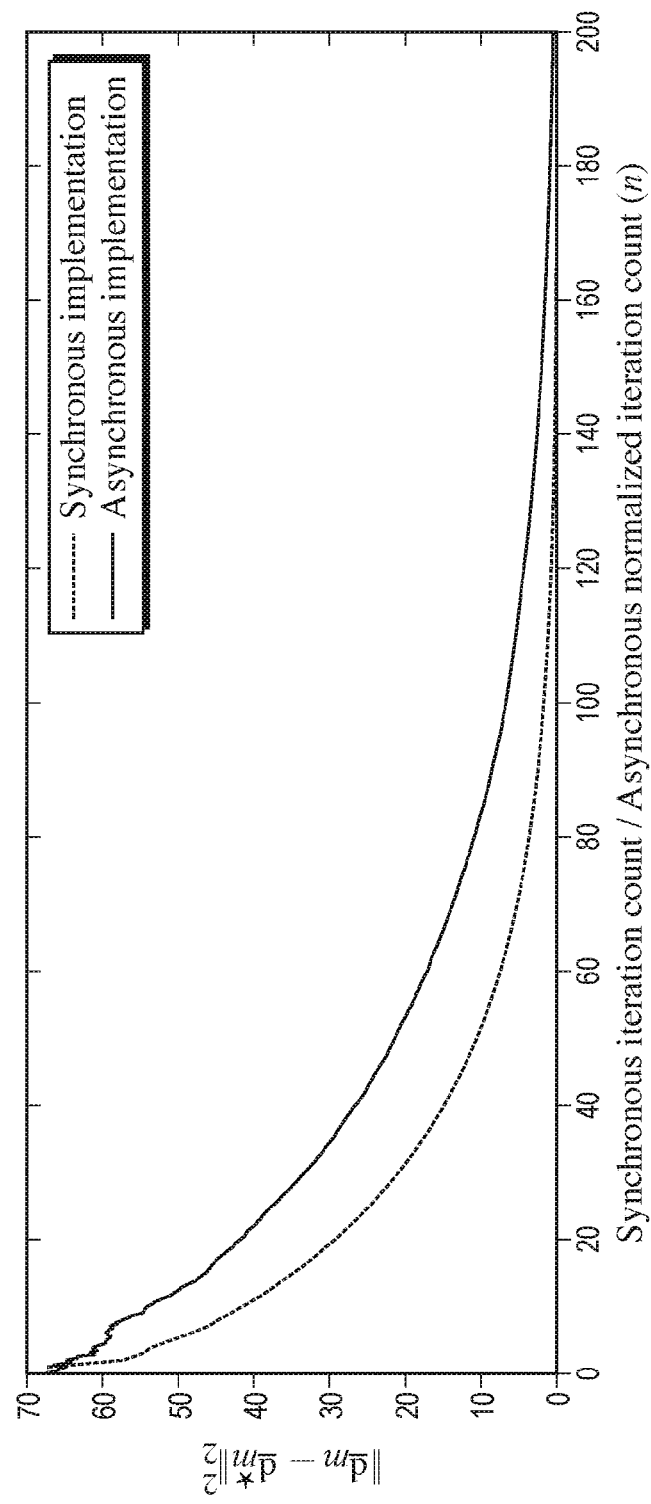
FIGS. 5B-5D illustrate results of executing the system depicted in FIG. 5A.
Figure 5C:
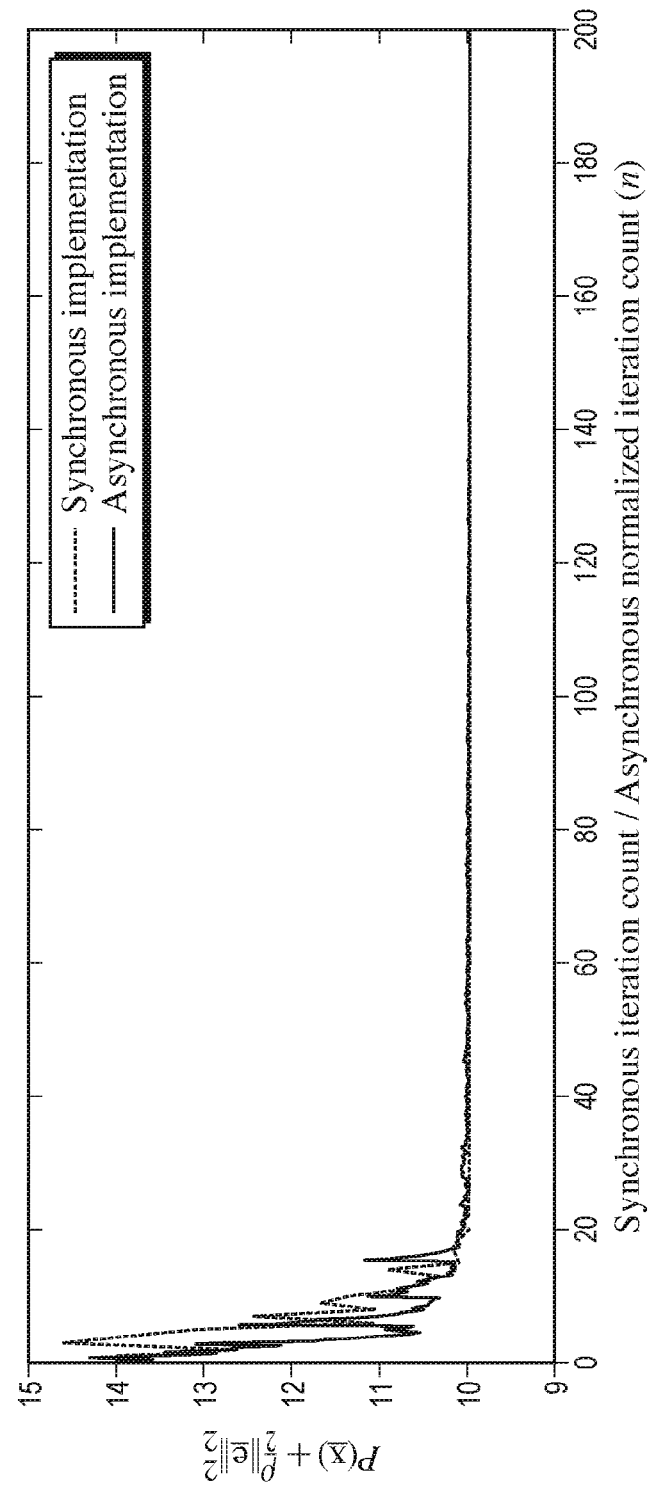
Figure 5D:
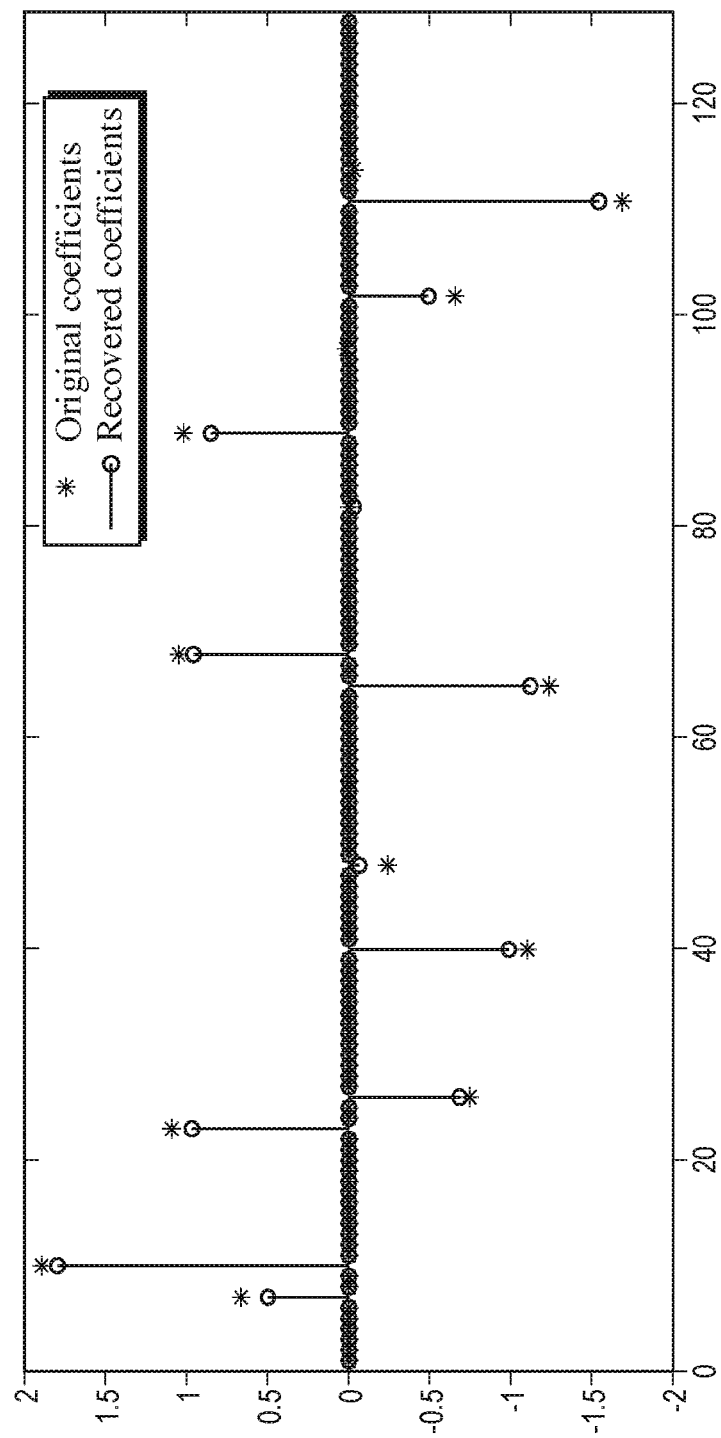

FIGS. 5B-5D depict numeric simulations corresponding to solving the optimization problem 550 using the system 500 and solving the same optimization problem using a synchronous implementation. FIG. 5C shows that convergence can be achieved using the asynchronous system 500 described with reference to FIG. 5A, and the asynchronous system 500 requires a similar number of computations to those needed by the synchronous system. The asynchronous system 500, however, may not include hardware delay elements (e.g., registers) and may not need clock distribution circuitry spanning across various processing modules. As such, the asynchronous system 500 can be smaller, less complex, and/or less costly than a corresponding synchronous system. The asynchronous system may also be relatively easier to construct and may consume less power than the corresponding synchronous system.

Figure 6A:
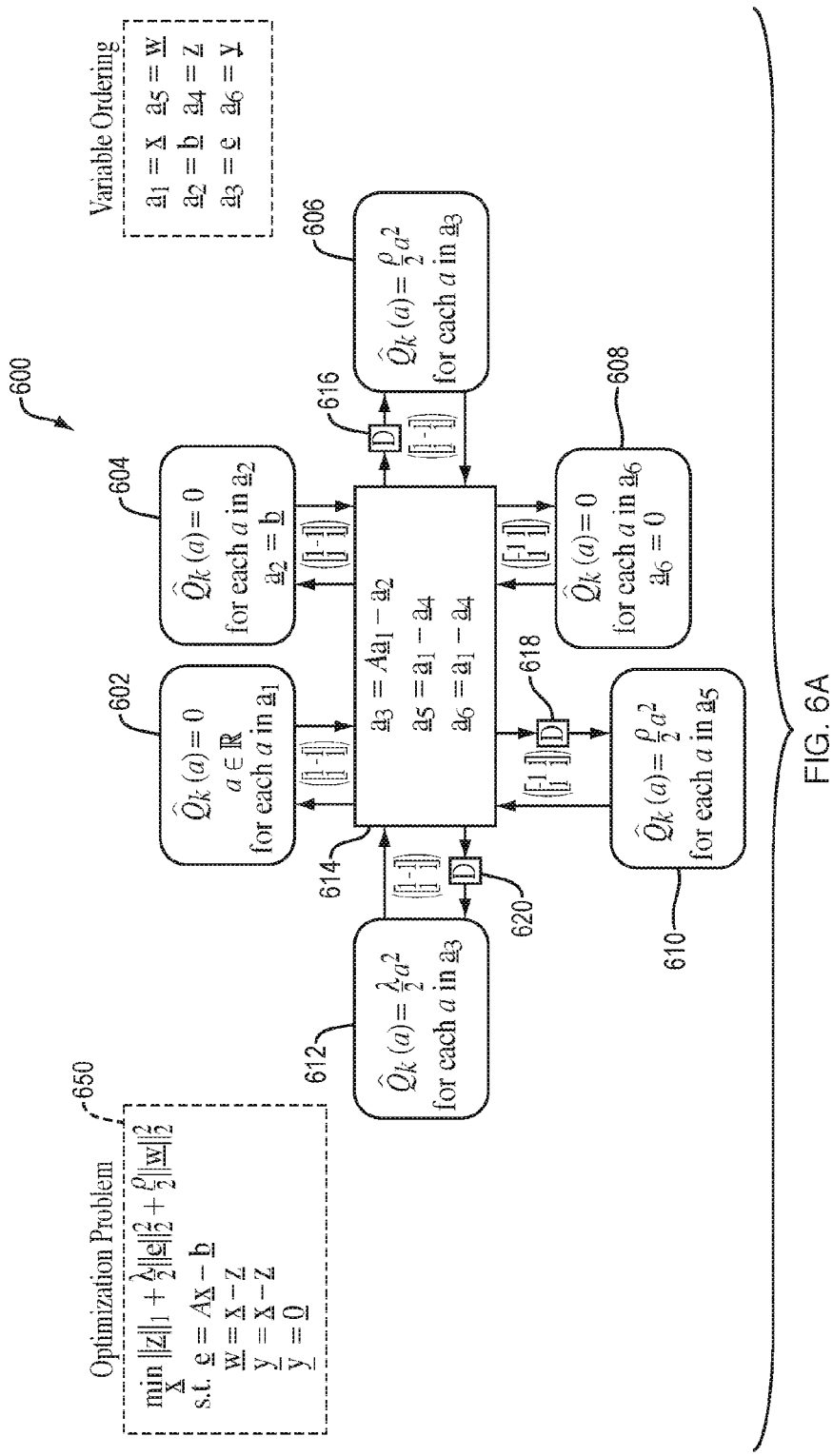
FIG. 6A schematically depicts an implementation of a system for solving a modified LASSO problem, according to another embodiment.

FIG. 6A depicts a signal processing system 600 for solving an augmented-cost LASSO problem identified as the optimization problem 650. The cost is augmented similarly to that of various ADMM formulations. The elements 602-612 are various constitutive relation elements corresponding different terms of the optimization problem 650, and the element 614 is a linear interconnection element. The parameters $\lambda$ and $\rho$ are selected to tradeoff between the sparsity of the solution and the enforcement of the linear equality constraints and to specify the relative enforcement of the augmentation, respectively. For the depicted solution $\lambda$ and $\rho$ are selected to be large, e.g., $\lambda=10^5$ and $\rho=2000$.

The optimization problem 650 includes a cost function:

$$\min_{\underline{x}} \|\underline{z}\|_1 + \frac{\lambda}{2}\|\underline{e}\|_2^2 + \frac{\rho}{2}\|\underline{w}\|_2^2$$

and constraints:

$$s.t. \underline{e} = A\underline{x} - \underline{b}$$

$$\underline{w} = \underline{x} - \underline{z}$$

$$\underline{y} = \underline{x} - \underline{z}$$

$$\underline{y} = 0$$

The terms $$\|\underline{z}\|_1, \frac{\lambda}{2}\|\underline{e}\|_2^2, \text{ and } \frac{\rho}{2}\|\underline{w}\|_2^2$$

of the cost function are implemented by the constitutive relationship elements 606, 612, 610, respectively. For example, the term $\|\underline{z}\|_1$ matches the reduced-form primal component shown in Column 2, Row 3 of the table in FIGS. 3A through 3D. The terms $$\frac{\lambda}{2}\|\underline{e}\|_2^2 \text{ and } \frac{\rho}{2}\|\underline{w}\|_2^2$$

match the reduced-form primal component shown in Column 2, Row 5 of the table in FIGS. 3A through 3D. For the first one of these two terms, the parameters $\rho_+$ and $\rho_-$ are set to be equivalent and are fixed to the parameter $\lambda$ of the optimization problem and, for the second one of these two terms, the parameters $\rho_+$ and $\rho_-$ are set to be equivalent and are fixed to the parameter $\rho$ of the optimization problem. The constraint term $\underline{y}=0$, which matches Column 2, Row 6 of the table in FIGS. 3A through 3D, is implemented by the constitutive relation element 608. In one embodiment, the term $\underline{e}=A\underline{x}-\underline{b}$ is first transformed into terms $\underline{e}=A\underline{x}-\underline{a}_2$; and $\underline{a}_2=\underline{b}$, as shown by variable ordering. The term $\underline{a}_2=\underline{b}$ is implemented by constitutive relationship element 604. The term $\underline{e}=A\underline{x}-\underline{a}_2$ and also the terms $\underline{w}=\underline{x}-\underline{z}$ and $\underline{y}=\underline{x}-\underline{z}$ are implemented by the linear interconnection element 614. In this optimization problem, $\underline{x}$ is not constrained, i.e., $\underline{x} \in \mathbb{R}$, which is implemented by the constitutive relation element 602.

The system 600 also includes delay elements 616, 618 between the linear interconnection element 614 and the constitutive relation elements 606, 610, 612, respectively. As such, in one embodiment, the elements 606, 610, 612 are implemented by three different processing modules. In some embodiments, one or more of the elements 602, 604, and 608 may be implemented by the same processing module that implements the linear interconnection element 614, and in other embodiments, one or more of the elements 602, 604, and 608 may be implemented by one or more different processing module(s).

Figure 6B:
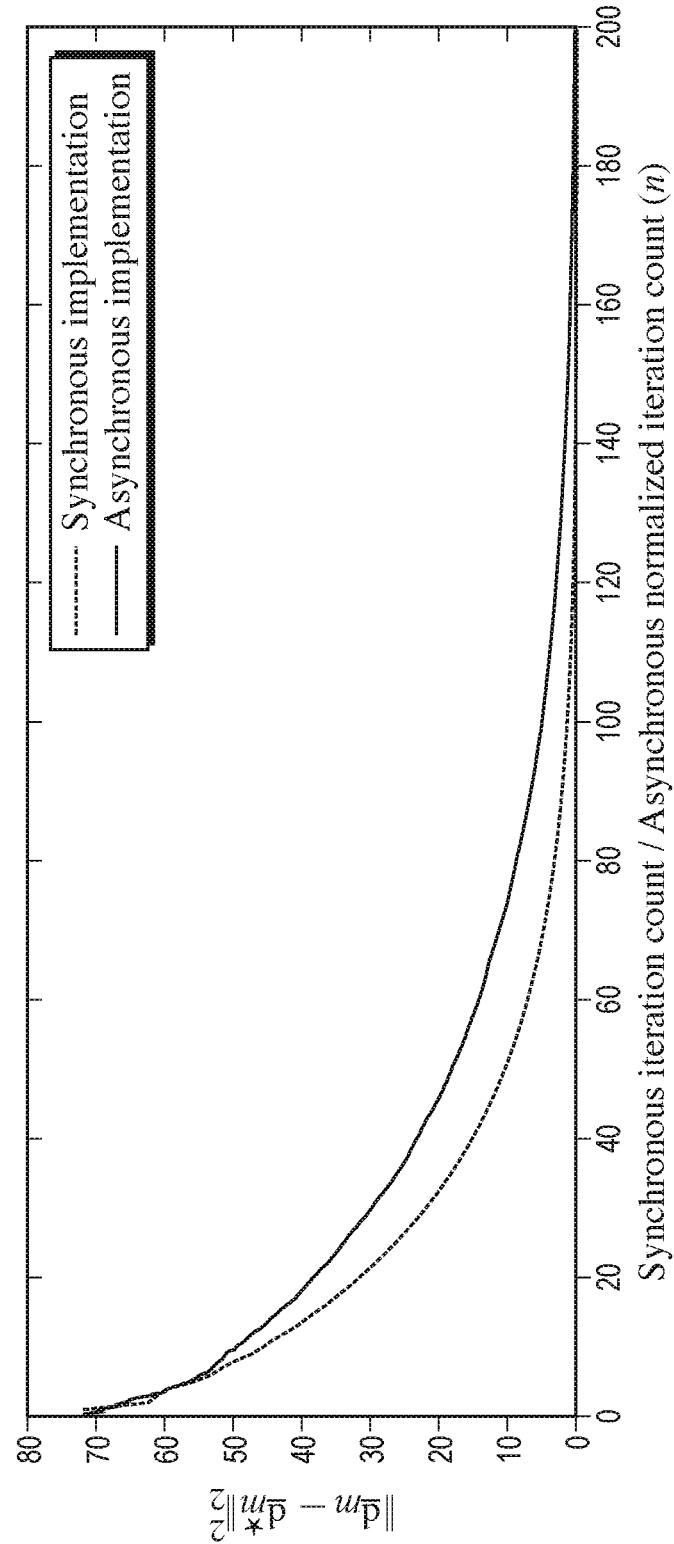
FIGS. 6B-6D illustrate results of executing the system depicted in FIG. 6A.
Figure 6C:
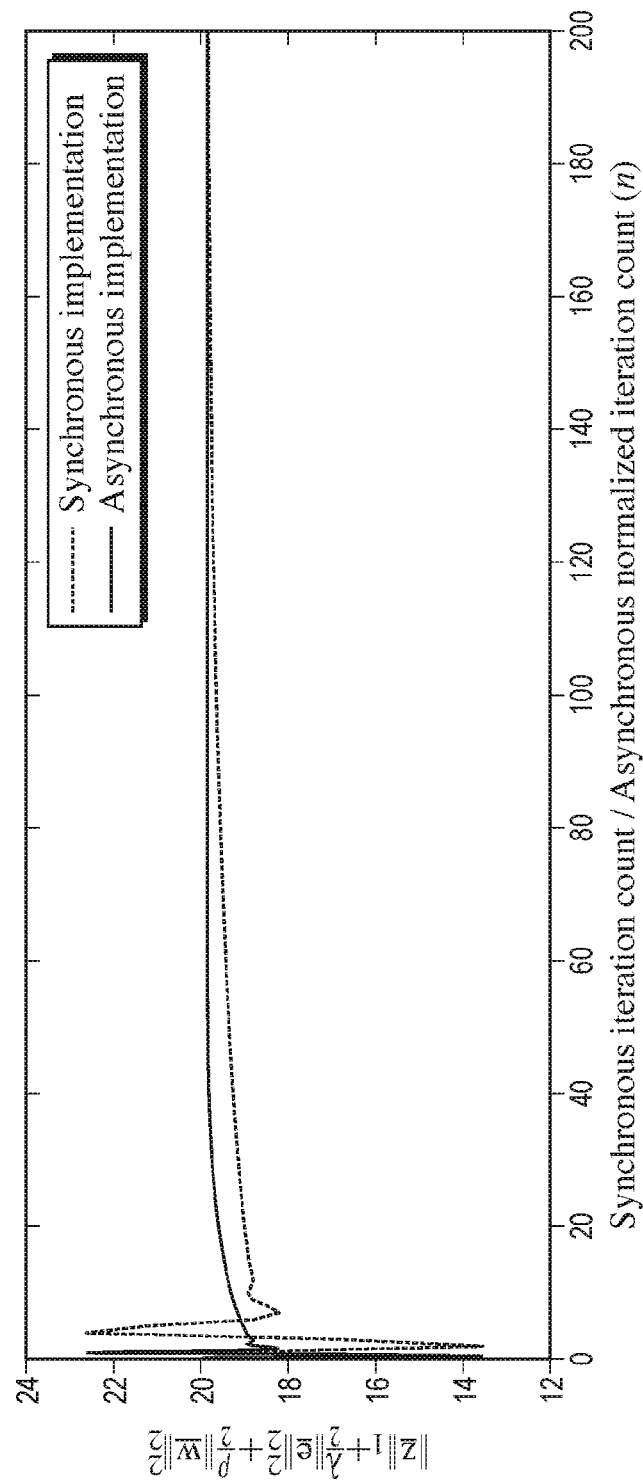
Figure 6D:
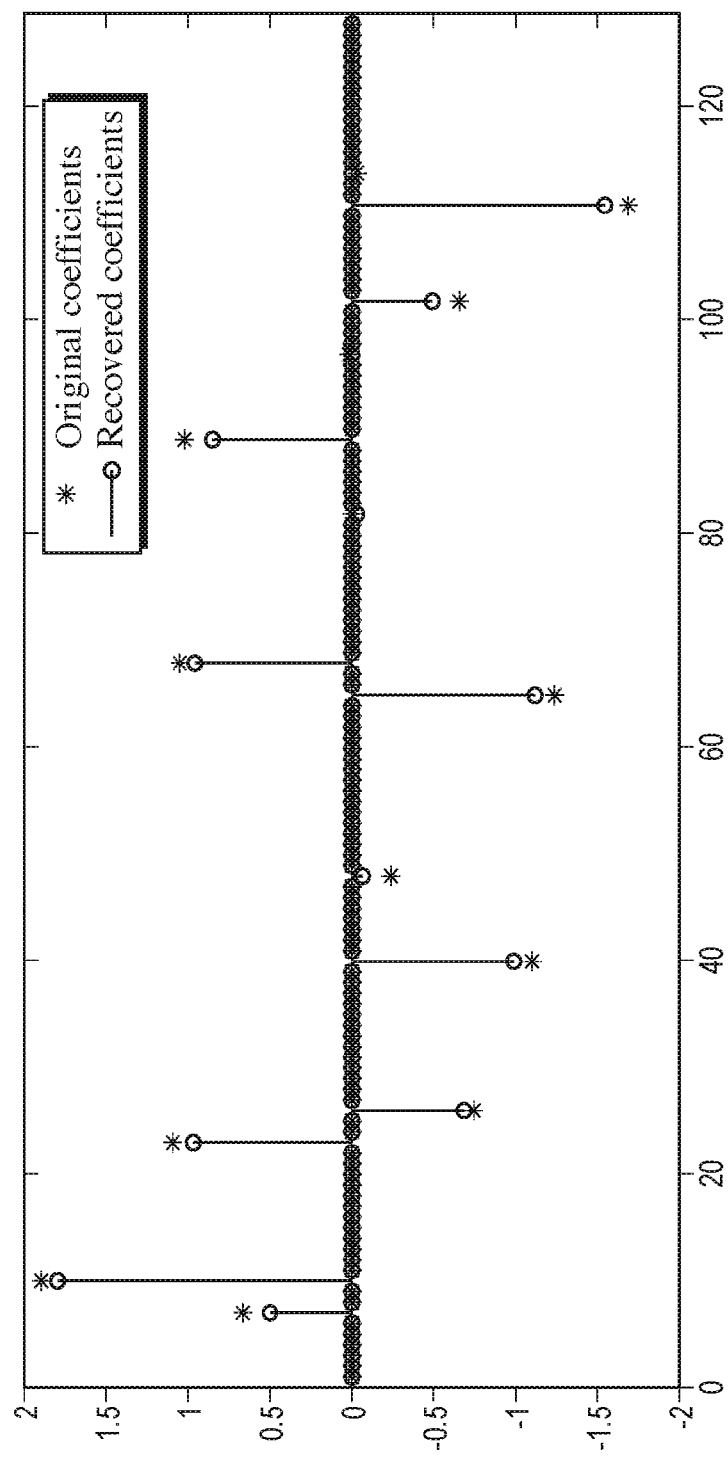

FIGS. 6B-6D depict numeric simulations corresponding to solving the optimization problem 650 using the system 600 and solving the same optimization problem using a synchronous implementation. FIG. 6C show that convergence can be achieved with fewer iterations than those needed by the synchronous system, using the asynchronous system 600.

Figure 7A:
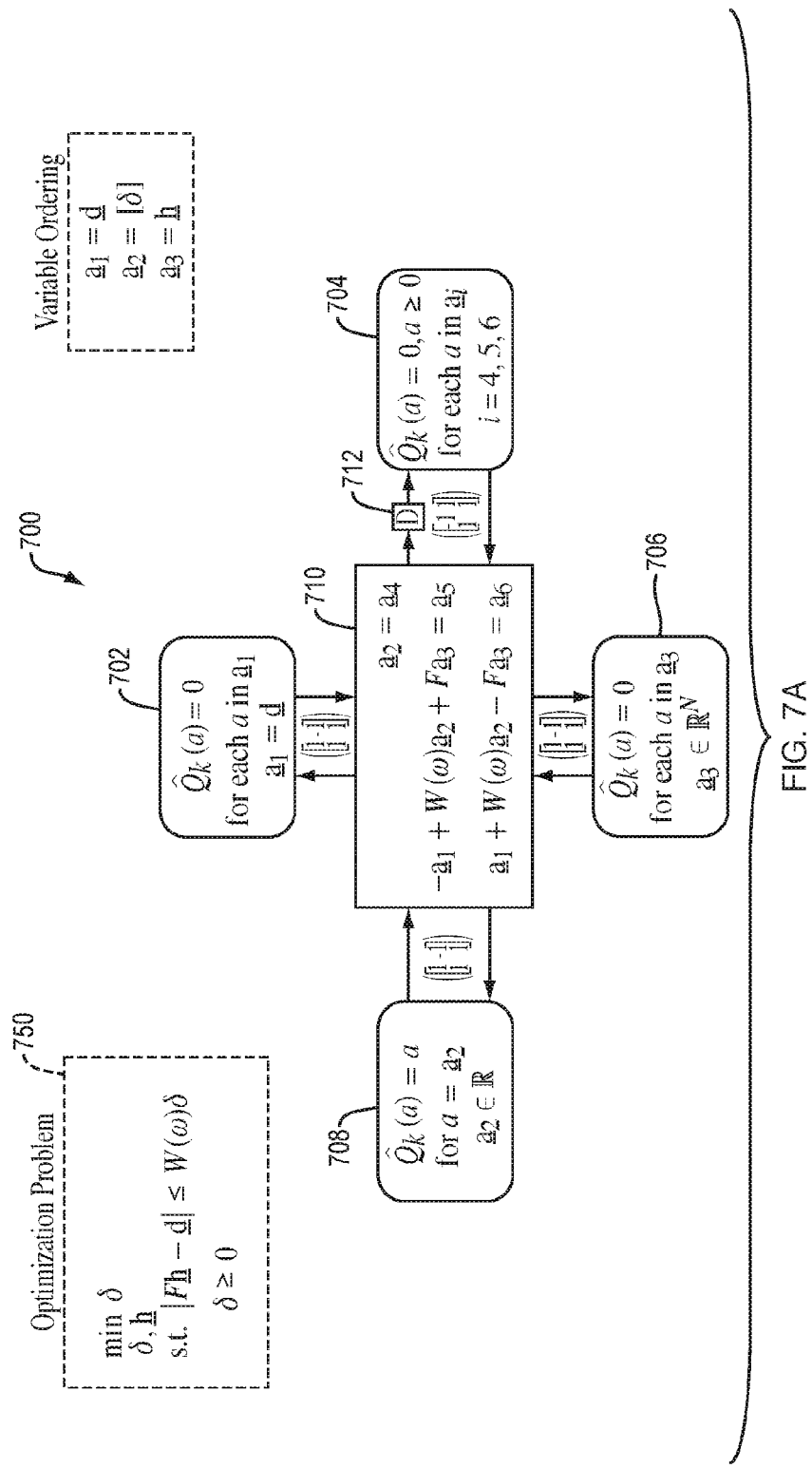
FIG. 7A schematically depicts an implementation of a system for performing minimax-optimal FIR filter design, according to one embodiment.
Figure 7D:
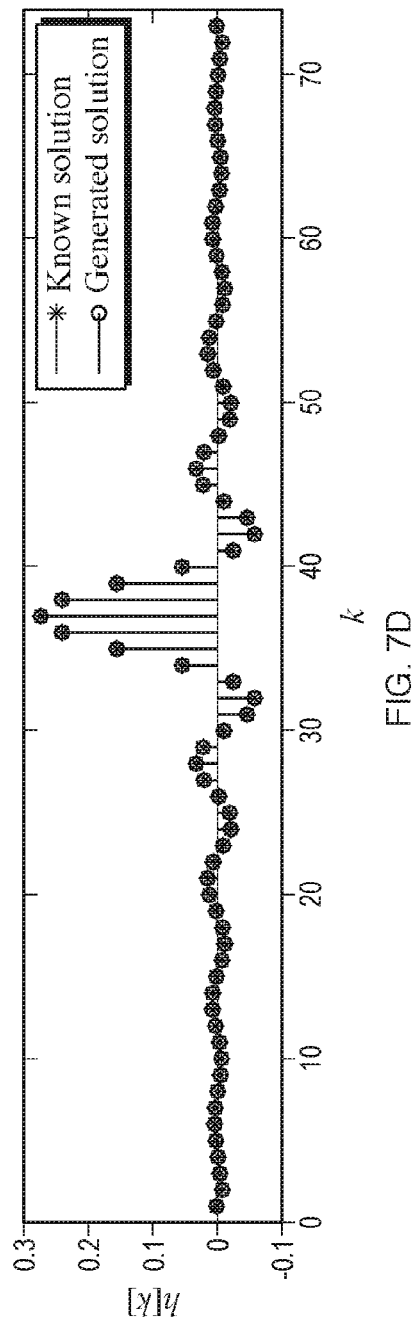
Figure 7E:
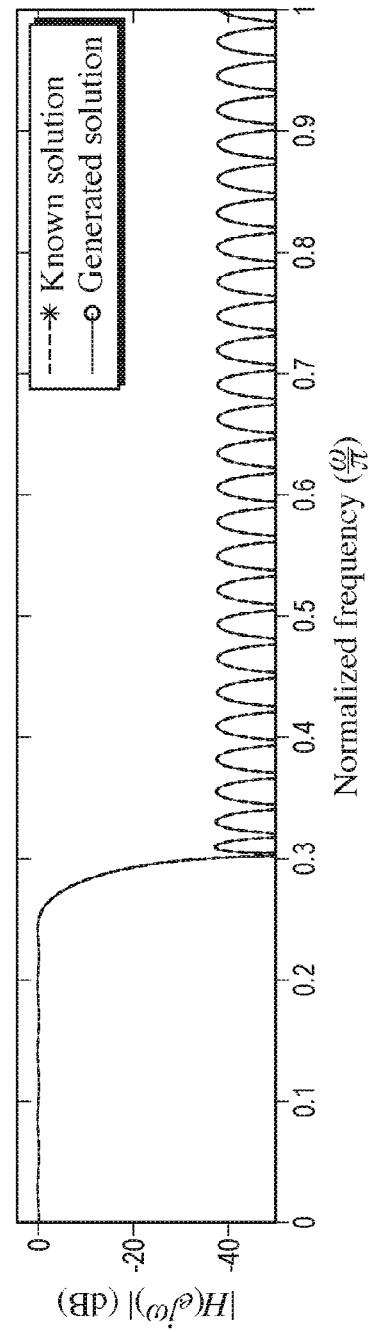

FIG. 7A depicts a signal processing system 700 for solving a minimax-optimal FIR filter design problem, specifically that of lowpass filter design. The filter design problem is identified as the optimization problem 750. The elements 702-708 are various constitutive relation elements corresponding different terms of the optimization problem 750, and the element 710 is a linear interconnection element. The system 700 also includes a delay element 712 between the linear interconnection element 710 and the constitutive relation element 704. As such, in one embodiment, the element 704 is implemented by a processing module different from any processing module used to implement the constitutive relation elements 702, 706, 708 and the linear interconnection element 810. One or more of the elements 702, 706, 708 may be implemented by the same processing module that implements the element 710. In some embodiments the elements 702, 706, 708, and 710 may be implemented by one or more processing modules.

In one embodiment, the delay element 712 is a vector delay element and the constitutive relation corresponding to the element 704 is a vector relation. As such, the computation corresponding to the element 704 is implemented by several processing elements or units. Each processing element/unit can be an individual processor, processor core, and/or customized circuitry. Different processing elements/units can also be different threads of a single processor. In some embodiments, the processing module implementing the element 704 can be a vector processor. The vector delay element can be an implicit element or an explicit element as described with reference to FIG. 5A. As such, the communication between different processing elements and the processing module implementing a linear interconnection element can be synchronous or asynchronous.

FIGS. 7B-7E depict numeric simulations corresponding to solving the optimization problem 750 using the system 700. The obtained results are compared with a known solution from the Parks-McClellan algorithm. FIGS. 7B and 7C show that convergence can be achieved in fewer iterations than those needed by the synchronous system using the asynchronous system 700.

Figure 8A:
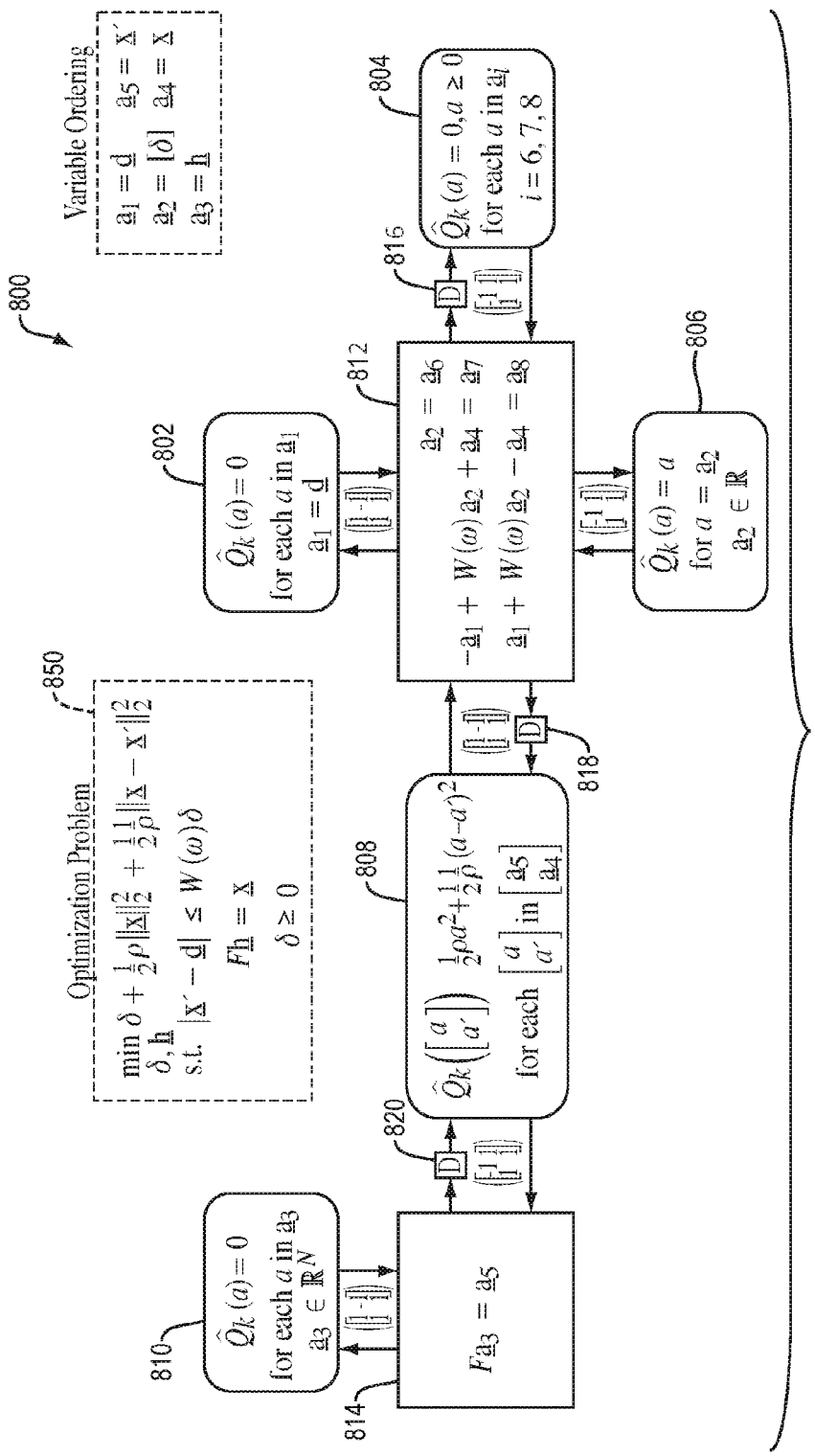
FIG. 8A schematically depicts an alternative implementation of a system for performing the minimax-optimal FIR filter design, according to another embodiment.
Figure 8B:
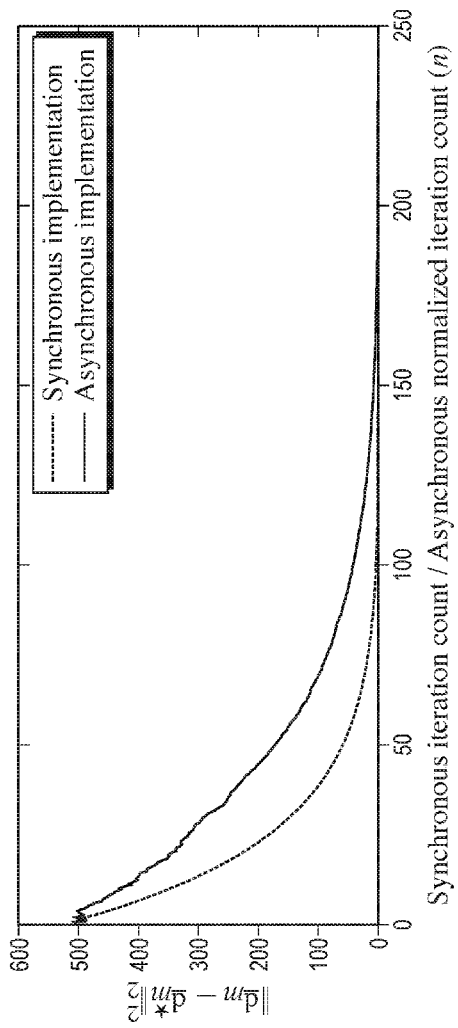
FIGS. 8B-8E illustrate results of executing the system depicted in FIG. 8A.

FIG. 8A depicts a processing system 800 for solving an alternative algorithm for minimax-optimal filter design. The alternative algorithm is obtained by slight modification of the problem described with reference to FIG. 7A, identified as the optimization problem 850 in FIG. 8A. The elements 802-810 are various constitutive relation elements corresponding different terms of the optimization problem 850, and the elements 812, 814 are linear interconnection elements. The parameters $\rho$ is selected to specify the relative enforcement of equality between the system variables loosely shared between the two linear interconnection elements 812, 814. For the depicted solution $\rho$ is selected to be small (e.g., $1 \times 10^{-4}$), resulting in a very close approximation to the lowpass filter design problem described with reference to FIG. 7A.

The system 800 includes delay elements 816-818 between the linear interconnection element 812 and the constitutive relation elements 802, 804, 806, 808, respectively. The system 800 also includes a delay element 820 between the linear interconnection element 814 and the constitutive relation element 808. As such, in one embodiment, the elements 804 and 808 are implemented by different processing modules. In this embodiment, the elements 802 and 806 may be implemented by the same processing module that implements the element 812, and the element 810 may be implemented by the same processing module that implements the linear interconnection element 814. Because the type of none of the constitutive relation elements 804 and 808 is "source element," convergence is guaranteed in this embodiment, while allowing for maximized distributed computing, which can improve the performance of the system 800. It should be understood, however, that a system having a delay element between a constitutive relation element of type source element and a linear interconnection element can also converge. In other embodiments, either one or both of the elements 804, 808 can be implemented by the processing module implementing the linear interconnection element 812. In some embodiments, the elements 808 may be implemented by the processing module implementing the linear interconnection element 814.

Figure 8C:
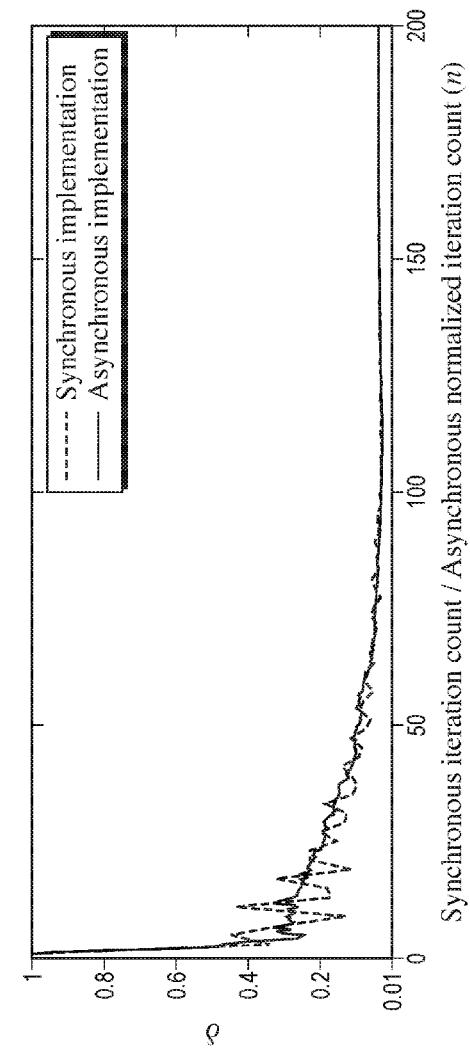
Figure 8D:
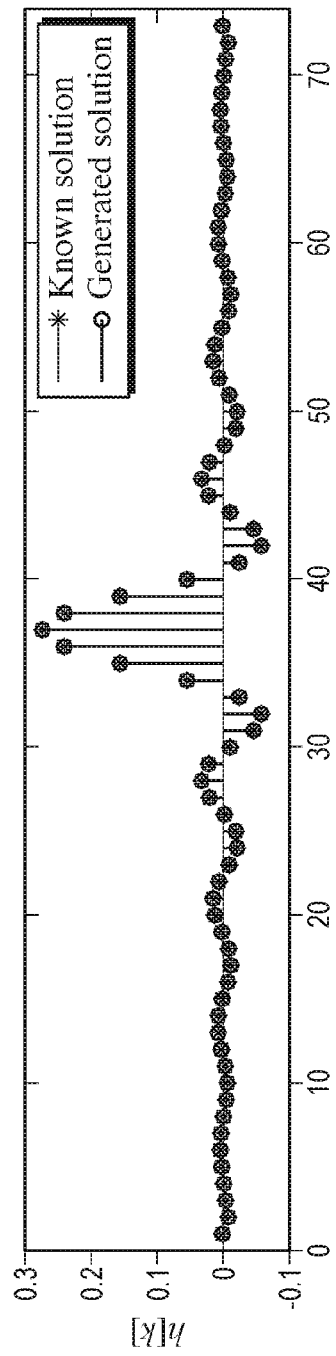
Figure 8E:
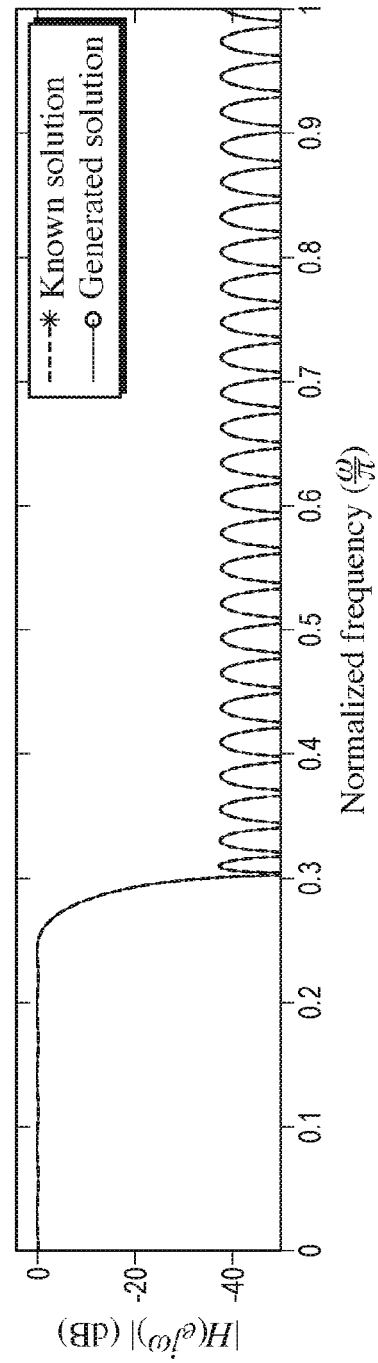

FIGS. 8B-8E depict numeric simulations corresponding to solving the optimization problem 850 using the system 800 and solving the same optimization problem using a synchronous implementation. FIG. 8C shows that convergence can be achieved in fewer iterations than those needed by the synchronous system, using the asynchronous system 800.

Figure 9A:
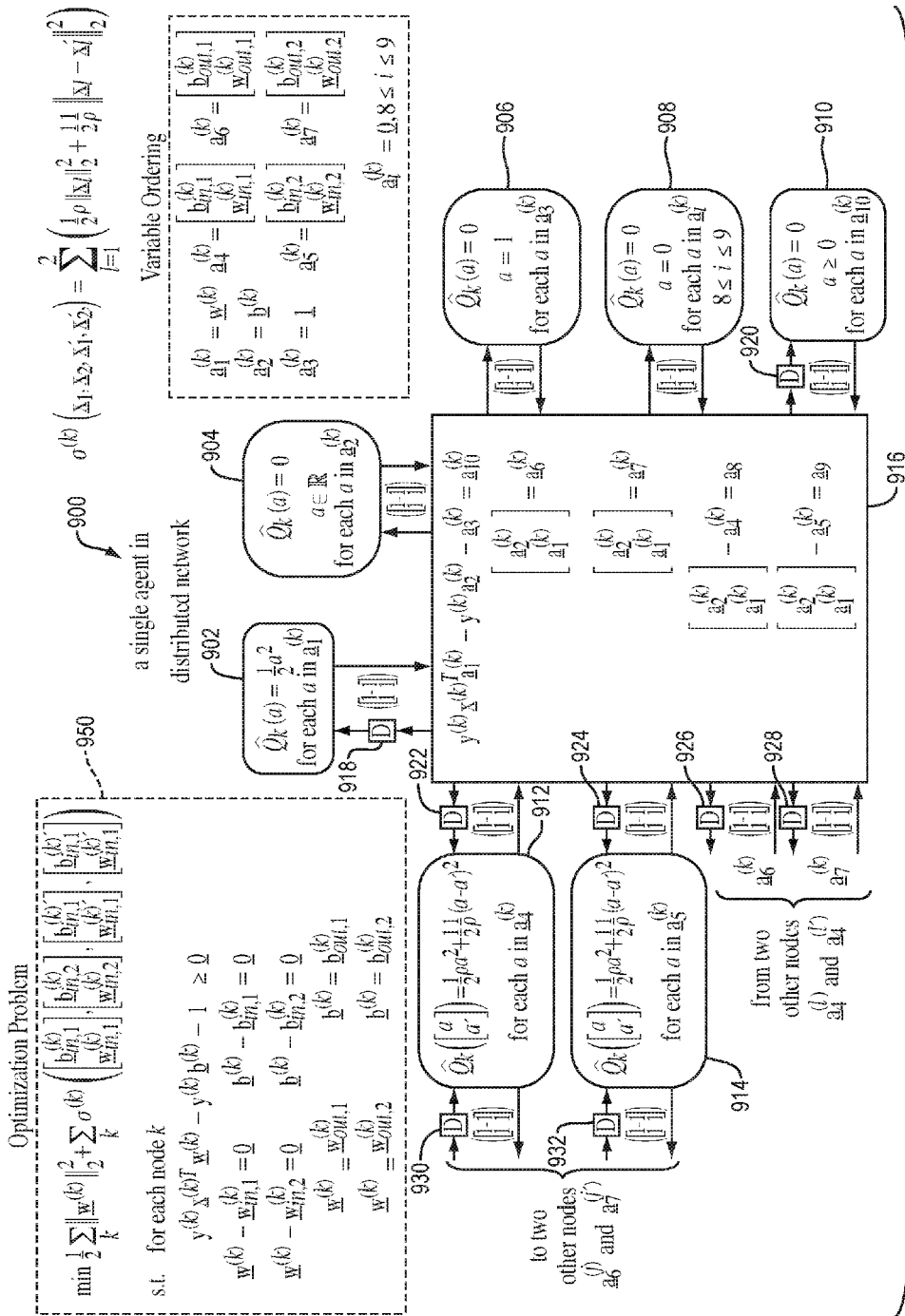
FIG. 9A schematically depicts a system generated using the presented framework according to one embodiment, for supporting a vector machine classification trained using a decentralized algorithm.

FIG. 9A depicts a signal processing system 900 for a single agent in a connected graph implementing a decentralized algorithm for training a support vector machine classifier. This system solves the optimization problem 950. The elements 902-914 are various constitutive relation elements corresponding different terms of the optimization problem 950, and the element 916 is a linear interconnection element. The parameters $\rho$ is selected to specify the relative enforcement of equality between the shared system variables between each agent in a computational graph, where each node of the graph is a processing module. For the depicted solution $\rho$ is selected to be small (e.g., $1 \times 10^{-4}$), and the computation graph is connected with edges selected such that each node, as depicted above, has exactly four connections, i.e., each processor sends data to two other processors and receives data from two other processors.

The system 900 also includes delay elements 918-924 between the linear interconnection element 916 and the constitutive relation elements 902, 910, 912, 914, respectively. Delay elements 926, 928 are inserted between the linear interconnection element 916 and additional nodes that are not shown. Delay elements 930, 932 are inserted between the constitutive relation elements 912, 914 and additional nodes that are not shown. In general, a node can be a linear interconnection element, a constitutive relation element, or a processing module implementing the computation corresponding to any such elements. In one embodiment, the elements 902, 910, 912, 914, and 916 can be implemented by different processing modules/nodes. In this embodiment, the elements 904-908 may be implemented by the same processing module that implements the element 916. Because the type of none of the constitutive relation elements 902, 910, 912, 914 is "source element," convergence is guaranteed in this embodiment. In other embodiments, one or more of the elements 902-914 can be implemented by the processing module implementing the linear interconnection element 916. In some embodiments, two or all three of the elements 904-908 may be implemented by a single processing module or any of the processing modules/nodes implementing any of the elements 902, 910, 912, 914.

Figure 9B:
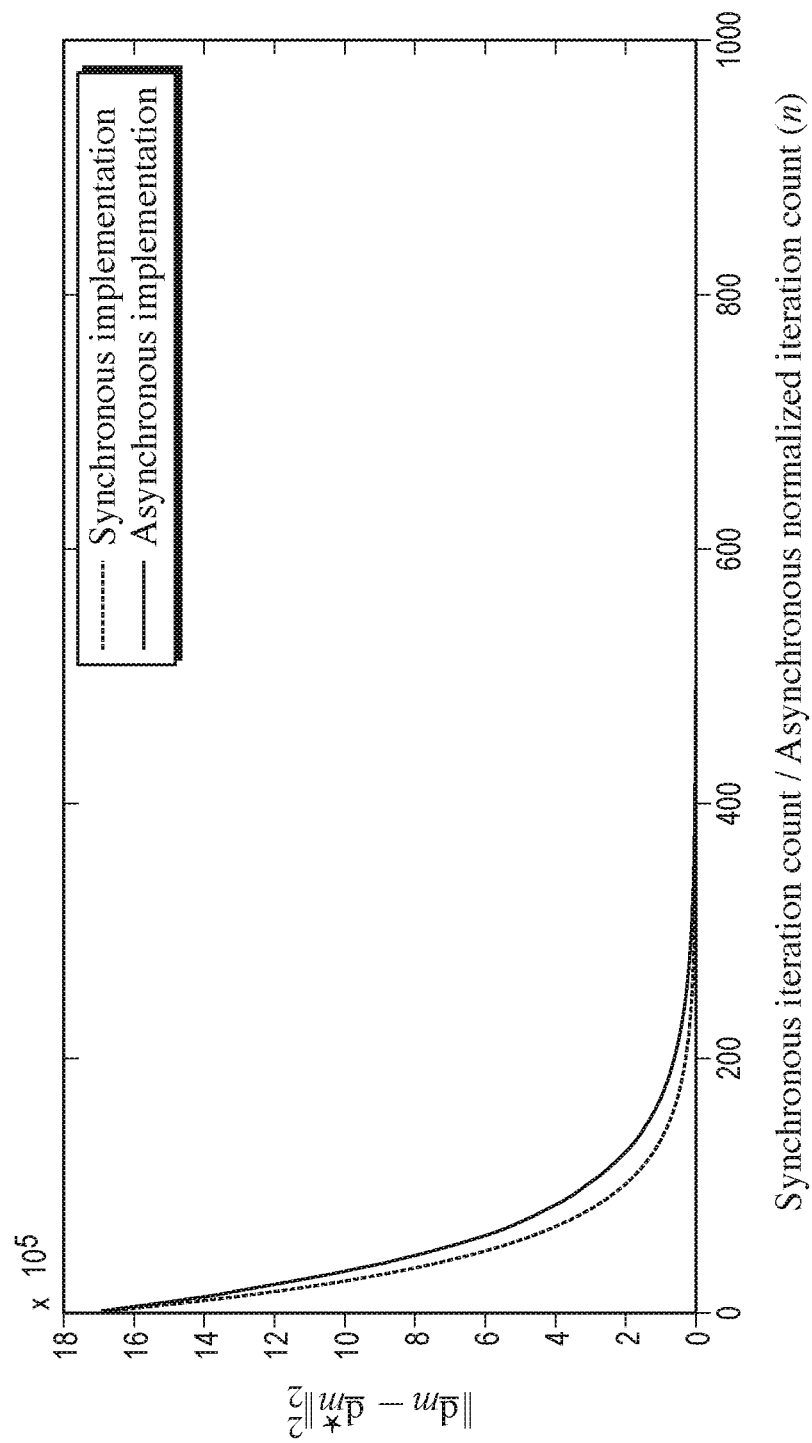
FIGS. 9B-9D illustrate results of executing the system depicted in FIG. 9A.
Figure 9C:
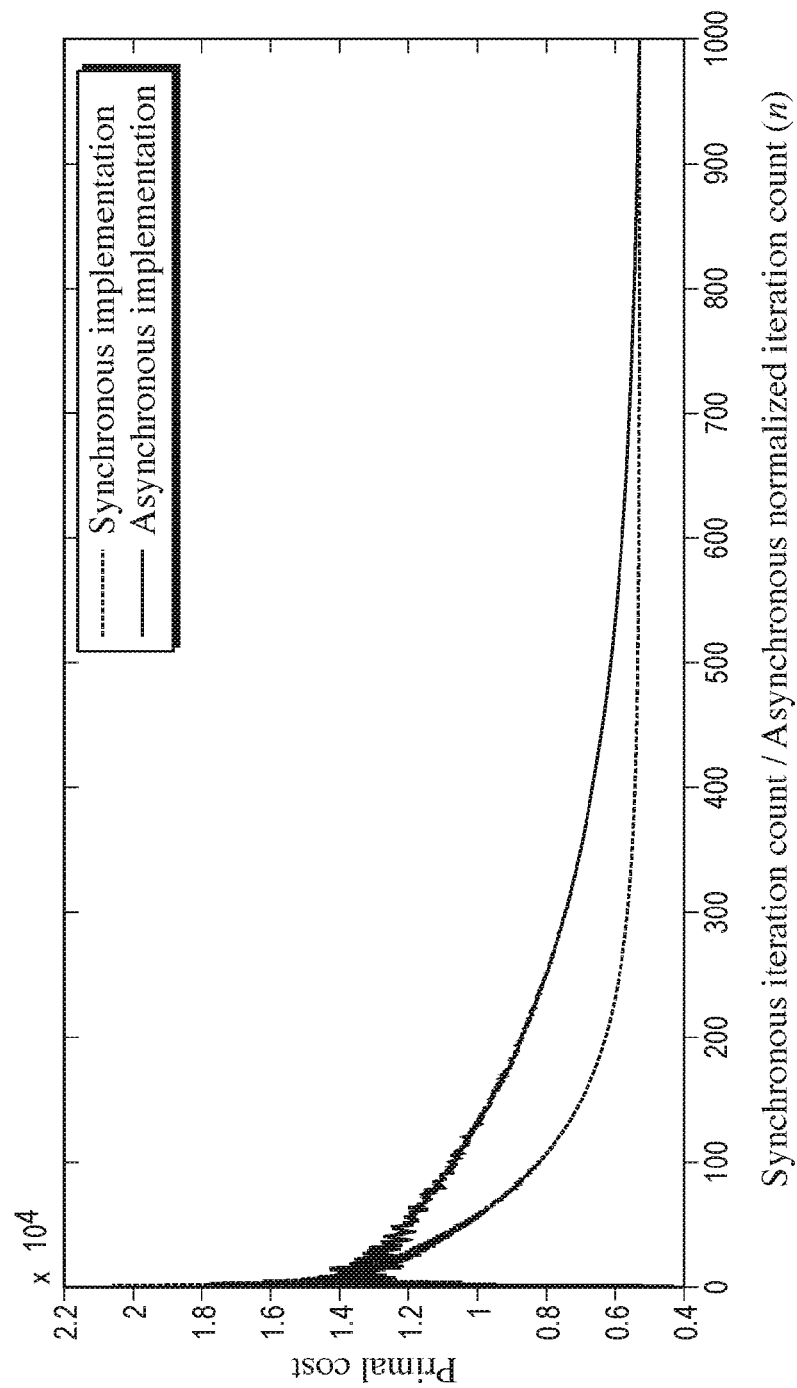
Figure 9D:
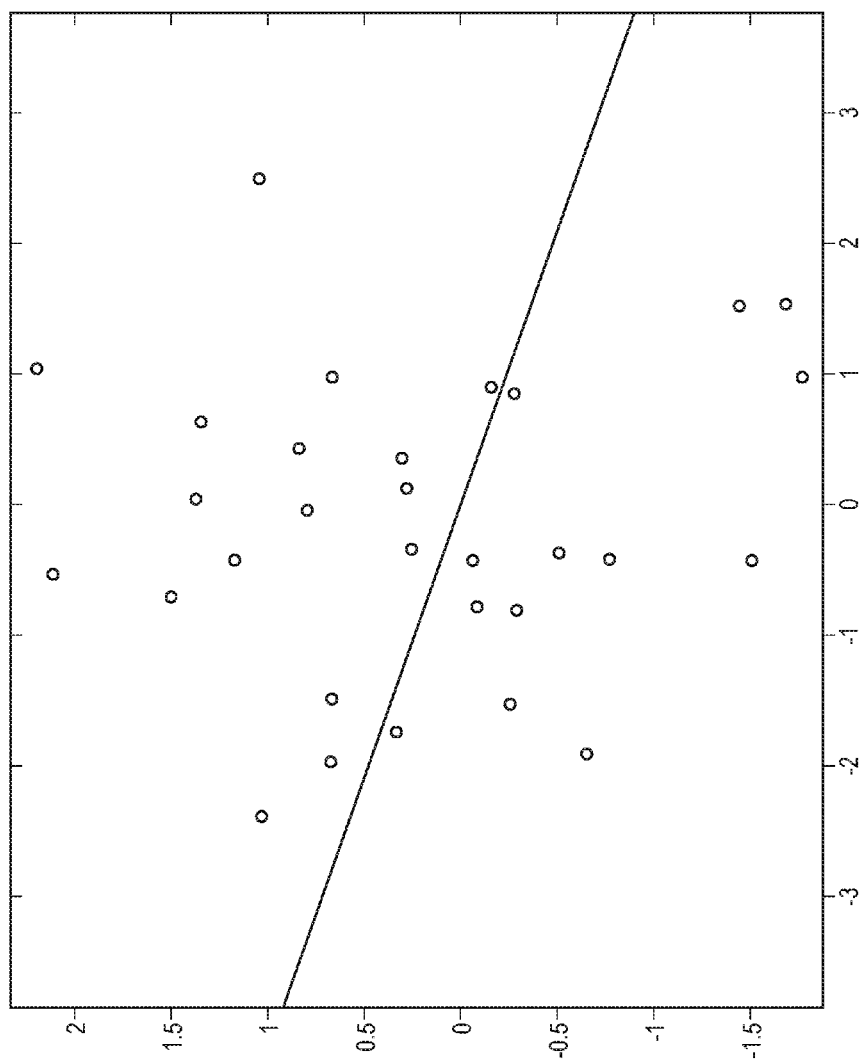

FIGS. 9B-9D depict numeric simulation of a system involving 30 agents similar to the agent 900 shown in FIG. 9A, with each agent having knowledge of a single training vector. FIG. 9C shows that convergence can be achieved in fewer iterations than those needed by the synchronous system, using the asynchronous system based on the agent architecture 900.

Figure 10A:
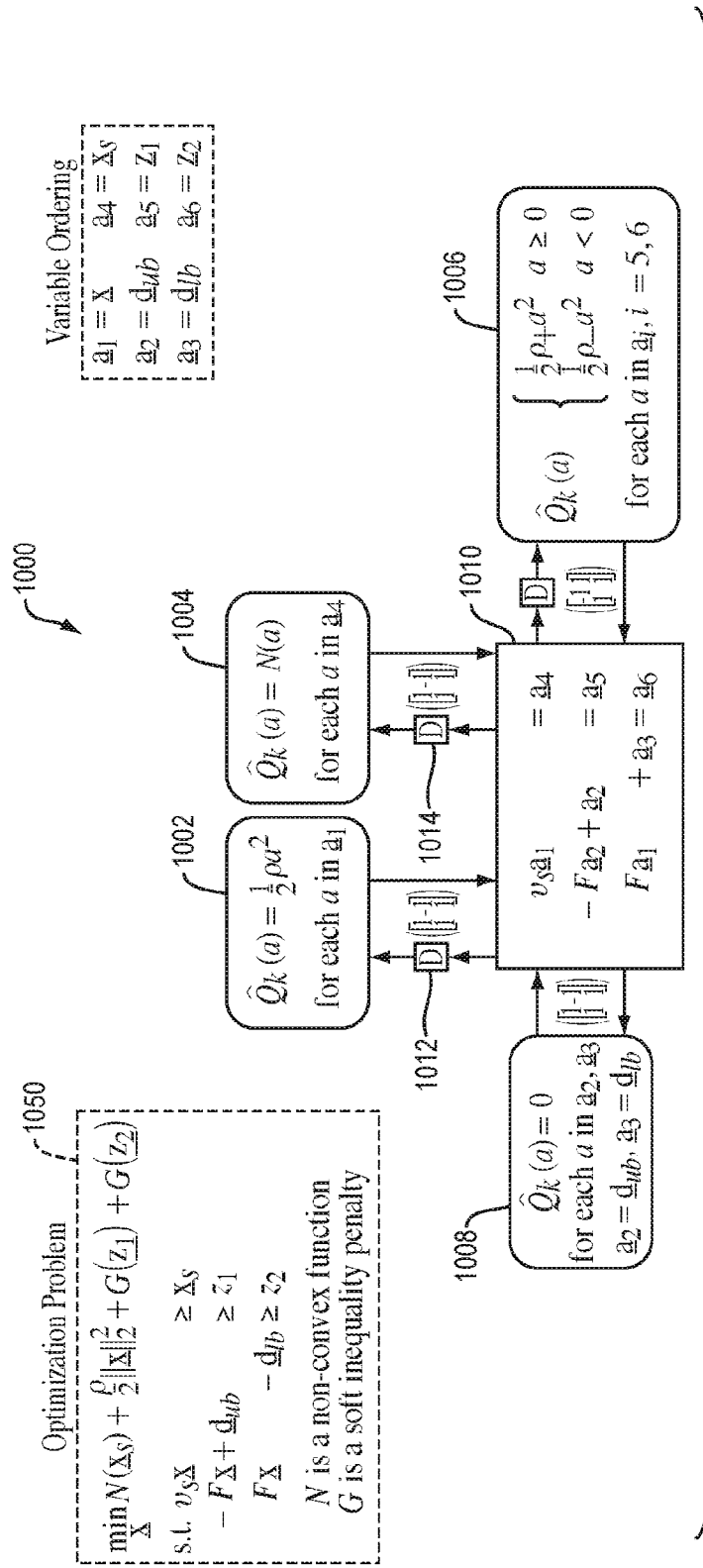
FIG. 10A schematically depicts a system generated using the presented framework according to one embodiment, for solving a nonconvex optimization algorithm aimed at the problem of designing a sparse FIR filter for acoustic equalization.

FIG. 10A depicts a signal processing system 1000 for solving a nonconvex sparse filter design problem identified as the optimization problem 1050. The elements 1002-1008 are various constitutive relation elements corresponding different terms of the optimization problem 1050, and the element 1010 is a linear interconnection element. The parameters $\rho$ and $v_s$ are respectively selected to specify the enforcement of the size of $\underline{x}$ and the width of the sudden decrease in cost about 0 for the nonconvex element. The parameters $\rho_+$ and $\rho_-$ affect the enforcement of the soft inequality constraints. For the depicted solution $\rho$ and $\rho_+$ are selected to be small (e.g., 0.05) and $\rho_-$ and $v_s$ are selected to be large (e.g., 100).

The system 1000 also includes delay elements 1012-1016 between the linear interconnection element 1010 and the constitutive relation elements 1002, 1004, 1006, respectively. As such, in one embodiment, the elements 1002, 1004, 1006, and 1010 are implemented by different processing modules. In this embodiment, the element 1008 may be implemented by the same processing module that implements the element 1010. Because the type of none of the constitutive relation elements 1002-1006 is "source element," convergence is guaranteed in this embodiment. In other embodiments, one or more of the elements 1002-1006 can be implemented by the processing module implementing the linear interconnection element 1010. In some embodiments, two or all three of the elements 1002-1006 may be implemented by a single processing module.

Figure 10B:
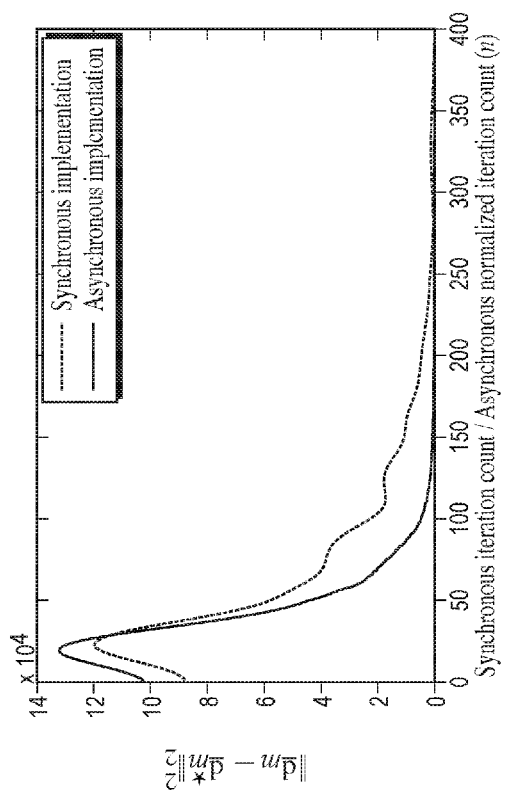
FIGS. 10B-10E illustrate results of executing the system depicted in FIG. 10A.
Figure 10C:
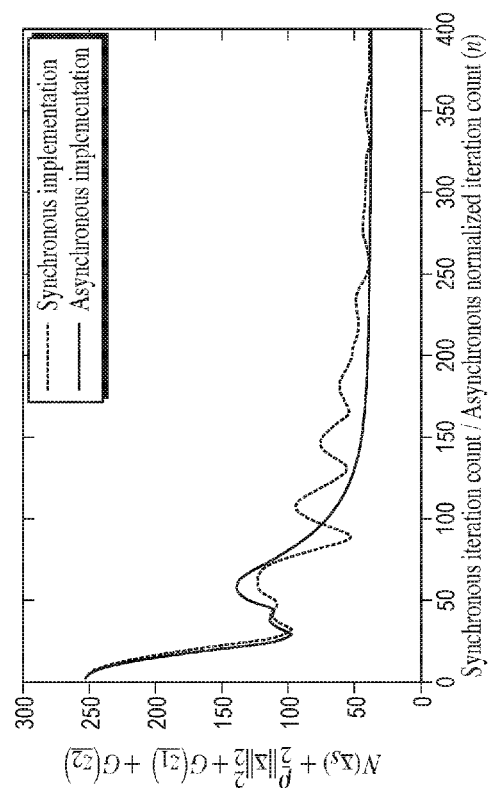
Figure 10D:
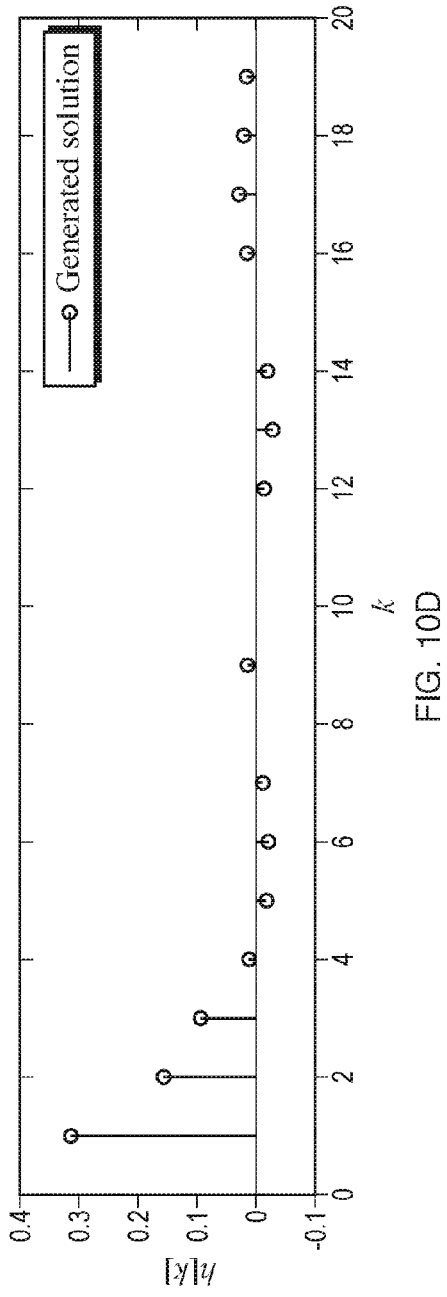
Figure 10E:
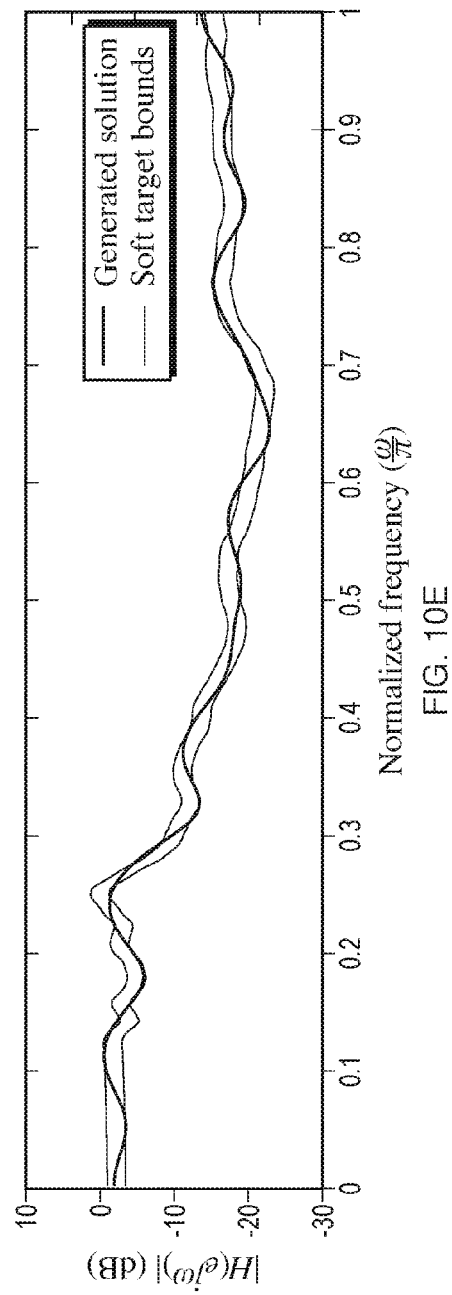

FIGS. 10B-10E depict numeric simulations corresponding to solving the optimization problem 1050 using the system 1000 and solving the same optimization problem using a synchronous implementation. FIGS. 10B and 10C show that convergence can be achieved in fewer iterations than those needed by the synchronous system using the asynchronous system 1000.

In some embodiments, elements can be selected from FIGS. 2A, 2B, and 3A through 3D and may be interconnected. The interconnection of these elements corresponds to various terms representing a cost function and, optionally, one or more constraints on the variables associated with the cost function. Thus, the interconnection of the selected elements represents a synthesized optimization problem. If delays are introduced between the selected constitutive relation elements and the selected linear interconnection elements such that no delay is associated with source elements, a network of these interconnected elements can be implemented as a distributed processing/computing system that is guaranteed to converge when the associated convergence conditions are satisfied. Thus, the network guarantees that the synthesized optimization problem can be efficiently solved. Therefore, such a framework can be used to design new optimization problems with confidence that the problem can be efficiently solved using a distributed processing system. A suitable system can be readily and automatically derived from the network.

Thus, examples of various synchronous and asynchronous processing systems for performing optimization, utilizing the framework and elements described earlier, are presented above. The general strategy was to perform a linear transformation of stationarity conditions applicable to a class of convex and nonconvex optimization problems, resulting in algorithms that operate on a linear superposition of the associated primal and dual decision variables. The examples described address various specific optimization problems including the LASSO problem, minimax-optimal filter design, the decentralized training of a support vector machine classifier, and sparse filter design for acoustic equalization. More than one algorithms and system architectures for solving some optimization problems are presented, illustrating the use of the associated framework in designing a variety of distinct classes of algorithms and corresponding system architectures. The numeric simulation and convergence of the various systems is demonstrated, showing the benefits of the systems synthesized according to various embodiments described herein.

Various equations and corresponding analysis described above can also be used to synthesize new constitutive relation elements and linear interconnection elements that can be used for synthesizing systems for solving various optimization problems. The realization as a map corresponding to a newly synthesized element can be used to configure a processing module to perform a computation represented by the synthesized component. That processing module can then be used, as described above with reference to FIGS. 5A, 6A, 7A, 8A, 9A, and 10A, in systems for solving various optimization problems.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for configuring a distributed processing system to solve an optimization problem, the method comprising the steps of:
   for each term of an optimization problem, selecting using a selector one of:
   (i) a constitutive relation element representing a first computation transforming a vector variable according to a stationarity condition, the stationarity condition maintaining a first cost function based on at least one of primal and dual decision variables constant to first order of variance of the primal and dual decision variables when the primal and dual decision variables vary within a functional constraint, the first computation corresponding to the term; and
   (ii) a linear interconnection element representing a second computation comprising an assignment or a combination according to a linear stationarity condition, the linear stationarity condition maintaining a second cost function based on at least one of the primal and dual decision variables constant to first order of variance of the primal and dual decision variables when the primal and dual decision variables vary within the functional constraint, the second computation transforming a first vector variable associated with the term into a second vector variable associated with the term,
   the selecting step comprising selecting at least one constitutive relation element and at least one linear interconnection element;
   programming a processing unit: (i) to configure in a distributed processing system a first processing module to implement at least one selected constitutive relation element, and (ii) to configure in the distributed processing system a second, different processing module to implement at least one of: (A) at least one selected linear interconnection element and (B) another selected constitutive relation element;
   asynchronously interconnecting in the distributed processing system each selected constitutive relation element and each selected linear interconnection element, an asynchronous delay associated with at least one asynchronous interconnection providing a speed improvement or cost reduction; and
   configuring the first processing module of the distributed processing system to implement a computation represented by at least one of a first constitutive relation element and a first linear interconnection element.

2. The method of claim 1, wherein:
   the optimization problem comprises an overall cost function;
   each constitutive relation element is associated with a respective individual cost function; and
   a sum of the respective individual cost functions equals the overall cost function.

3. The method of claim 1, wherein the optimization problem comprises at least one constraint.

4. The method of claim 1, wherein the first processing module is configured to implement the computation represented by the first constitutive relation element, the method further comprising at least one of:
   further configuring the first processing module to implement a computation represented by a second constitutive relation element; and
   further configuring the first processing module to implement a computation represented by at least one linear interconnection element.

5. The method of claim 1, further comprising inserting a first delay element between the first constitutive relation element and the first linear interconnection element, wherein the first constitutive relation element is other than a source element.

6. The method of claim 5, wherein a delay time associated with the first delay element is randomly selected.

7. The method of claim 5, wherein the first processing module is configured to implement the computation represented by the first constitutive relation element, the method further comprising:
   configuring the second, different processing module of the processing system to implement the computation represented by the first linear interconnection element.

8. The method of claim 7, further comprising inserting a first delay module, having a delay at least equal to a delay of the first delay element, in a data path between the first and second processing modules.

9. The method of claim 7, wherein at least one of:
   a computation time of the first processing module in implementing the computation represented by the first constitutive relation element is at most equal to a delay of the first delay element; and a computation time of the second processing module in implementing the computation represented by the first linear interconnection element is at most equal to the delay of the first delay element.

10. The method of claim 7, further comprising:
inserting a second delay element between a second constitutive relation element and the first linear interconnection element; and
configuring a third processing module of the processing system to implement a computation represented by the second constitutive relation element.

11. The method of claim 7, further comprising:
inserting a second delay element between the first constitutive relation element and a second linear interconnection element; and
configuring a third processing module of the processing system to implement a computation represented by the second linear interconnection element.

12. The method of claim 7, further comprising:
further configuring the second processing module to implement a computation represented by a second constitutive relation element.

13. The method of claim 7, wherein:
the first delay element comprises a vector delay element;
the first constitutive relation element comprises a vector constitutive relation element;
the first processing module comprises a plurality of processing elements; and
each processing element is configured to implement a computation represented by a respective element of the vector constitutive relation element.

14. The method of claim 7, further comprising solving the optimization problem by iteratively running the first and second processing modules until convergence,
the first processing module performing in each iteration the computation represented by the first constitutive relation element, and
the second processing module performing in each iteration the computation represented by the first linear interconnection element.

15. The method of claim 14, wherein data communication between the first and second processing modules comprises at least one of: (i) passing at least one value of the first vector variable, and (ii) passing at least one update to the first vector variable.

16. The method of claim 15, wherein at least one of the first and second processing modules is further configured to generate in at least one iteration a linear combination of a current value of the first vector variable and at least one of the previous values of the first vector variable.

17. A method for facilitating synthesis of a customized asynchronous distributed processing system to solve optimization problems, the method comprising the steps of:
selecting a transformation matrix and transforming a pair of input and output variables, by applying the selected transformation matrix thereto, into a pair of primal and dual decision variables;
applying at least one stationarity condition to the pair of the primal and dual decision variables to obtain a canonical representation of an optimization component comprising a functional constraint, the stationarity condition maintaining a cost function based on at least one of the primal and dual decision variables constant to first order of variance of the primal and dual decision variables when the primal and dual decision variables vary within the functional constraint;
modifying the canonical representation into a reduced-form representation of the optimization component, the reduced-form representation being based on an algebraic transformation of the canonical representation, by modifying the functional constraint into a set-based constraint; and
configuring a processor, for interconnecting units of the customized asynchronous distributed processing system, to implement a computation corresponding to the reduced-form representation of the optimization component, wherein an asynchronous delay associated with the interconnected asynchronous distributed processing system provides a speed improvement or cost reduction.

18. The method of claim 17, wherein:
the optimization component is one of a constitutive relation element and a linear interconnection element; and
the processor is configured to implement one of a computation corresponding to the constitutive relation element and a computation corresponding to the linear interconnection element.

19. A method for facilitating synthesis of a customized asynchronous distributed processing system to solve optimization problems, the method comprising the steps of:
modifying a reduced-form representation of an optimization component into a canonical representation comprising a cost function corresponding to a pair of primal and dual decision variables, the reduced-form representation being derived from an algebraic transformation of the canonical representation;
transforming a corresponding set-based constraint on the pair of the primal and dual decision variables, the set-based constraint satisfying a stationarity condition, into a transformed constraint satisfying a transformed stationarity condition, the transformed stationarity condition maintaining the cost function constant to first order of variance of the primal and dual decision variables when the primal and dual decision variables vary within the set-based constraint;
deriving a functional relationship between input and output variables, the functional relationship satisfying the transformed constraint; and
configuring a processor, for interconnecting units of the customized asynchronous distributed processing system, to implement the functional relationship, wherein an asynchronous delay associated with the interconnected asynchronous distributed processing system provides a speed improvement or cost reduction.

20. The method of claim 19, wherein:
the functional relationship corresponds to one of a constitutive relation element and a linear interconnection element; and
the processor is configured to implement one of a computation corresponding to the constitutive relation element and a computation corresponding to the linear interconnection element.

21. A method for synthesizing an optimization problem for implemented by an asynchronous distributed processing system, the method comprising the steps of:
receiving:
(i) a selection of: (a) at least one constitutive relation element representing a first computation transforming a vector variable according to a stationarity condition, the stationarity condition maintaining a first cost function based on at least one of primal and dual decision variables constant to first order of variance of the primal and dual decision variables when the primal and dual decision variables vary within a functional constraint, and (b) at least one linear interconnection element representing a second computation comprising an assignment or a combination according to a linear stationarity condition, the linear stationarity condition maintaining a second cost function based on at least one of the primal and dual decision variables constant to first order of variance of the primal and dual decision variables when the primal and dual decision variables vary within the functional constraint, the second computation transforming a first vector variable into a second vector variable; and (ii) a network configuration interconnecting in an asynchronous distributed processing system each selected constitutive relation element and each selected linear interconnection element, wherein an asynchronous delay associated with the network provides a speed improvement or cost reduction; and synthesizing an optimization problem comprising a plurality of terms, each term corresponding to one of: (A) a computation represented by a constitutive relation element, and (B) a computation represented by a linear interconnection element.

\* \* \* \* \*